United States Patent
Cha et al.

(10) Patent No.: US 12,505,655 B2
(45) Date of Patent: Dec. 23, 2025

(54) COMPUTER-IMPLEMENTED METHODS FOR ANALYZING THERMOGRAPHIC IMAGE HAVING ARTICLE OF INTEREST USING MACHINE LEARNING AND FOR TRAINING MACHINE LEARNING ALGORITHM THEREFOR

(71) Applicants: Young-Jin Cha, Winnipeg (CA); Rahmat Ali, Winnipeg (CA)

(72) Inventors: Young-Jin Cha, Winnipeg (CA); Rahmat Ali, Winnipeg (CA)

( * ) Notice: Subject to any disclaimer, the term of this patent is extended or adjusted under 35 U.S.C. 154(b) by 256 days.

(21) Appl. No.: 18/332,111

(22) Filed: Jun. 9, 2023

(65) Prior Publication Data

US 2024/0005645 A1 Jan. 4, 2024

Related U.S. Application Data

(60) Provisional application No. 63/350,487, filed on Jun. 9, 2022.

(51) Int. Cl.
*G06V 10/774* (2022.01)
*G06T 7/00* (2017.01)
(Continued)

(52) U.S. Cl.
CPC .......... *G06V 10/774* (2022.01); *G06T 7/0002* (2013.01); *G06V 10/7715* (2022.01);
(Continued)

(58) Field of Classification Search
CPC .............. G06T 7/0004; G06T 7/0002; G06T 2207/30132; G06T 2207/10048;
(Continued)

(56) References Cited

U.S. PATENT DOCUMENTS

2020/0175352 A1* 6/2020 Cha .......................... G06N 3/04

OTHER PUBLICATIONS

Ali, Rahmat. "Deep learning-and infrared thermography-based subsurface damage detection in a steel bridge." (2019). (Year: 2019).*

(Continued)

*Primary Examiner* — Raphael Schwartz
(74) *Attorney, Agent, or Firm* — Kyle R Satterthwaite; Ryan W Dupuis; Ade & Company Inc.

(57) ABSTRACT

A computer-implemented method for analyzing a thermographic image to detect an article of interest (AOI) comprises processing the image using a machine learning algorithm configured to detect the AOI and comprising a convolutional neural network (CNN); and displaying the image with location of the AOI being indicated if determined to be present. The CNN features a series pair of convolution modules configured to receive the image and form a reduced size feature map; an in-depth module thereafter and configured to learn correlations and contextual features of the image; and a superficial module after a first of the series convolution module pair and configured to extract features relevant to the AOI. Also, a computer-implemented method for generating synthetic training data based on authentic training data comprises a first neural network configured to generate the synthetic data and a second neural network configured to compare it to the authentic data to determine closeness.

20 Claims, 18 Drawing Sheets

(51) Int. Cl.
  *G06V 10/77* (2022.01)
  *G06V 10/776* (2022.01)
  *G06V 10/82* (2022.01)

(52) U.S. Cl.
  CPC ............ *G06V 10/776* (2022.01); *G06V 10/82* (2022.01); *G06T 2207/10048* (2013.01); *G06T 2207/20021* (2013.01); *G06T 2207/20081* (2013.01); *G06T 2207/20084* (2013.01); *G06T 2207/30184* (2013.01)

(58) Field of Classification Search
  CPC ...... G06T 2207/30108; G01M 5/0033; G01M 5/0066; G06V 20/176
  See application file for complete search history.

(56) References Cited

OTHER PUBLICATIONS

Ali, Rahmat, Jiangyu Zeng, and Young-Jin Cha. "Deep learning-based crack detection in a concrete tunnel structure using multispectral dynamic imaging." Smart Structures and NDE for Industry 4.0, Smart Cities, and Energy Systems. vol. 11382. SPIE, 2020. (Year: 2020).*

Ran, Rong, et al. "Crack-SegNet: Surface crack detection in complex background using encoder-decoder architecture." Proceedings of the 2021 4th International Conference on Sensors, Signal and Image Processing. 2021. (Year: 2021).*

* cited by examiner

COMPUTER-IMPLEMENTED METHODS FOR ANALYZING THERMOGRAPHIC IMAGE HAVING ARTICLE OF INTEREST USING MACHINE LEARNING AND FOR TRAINING MACHINE LEARNING ALGORITHM THEREFOR

This application claims the benefit under 35 U.S.C. 119(e) of U.S. Provisional application Ser. No. 63/350,487 filed Jun. 9, 2022, which is incorporated by reference herein.

FIELD OF THE INVENTION

The present invention relates to computer-implemented methods for analyzing, using machine learning, a thermographic image to detect an article of interest, such as a defect in a surface, for example a crack, and for training a machine learning algorithm therefor, and more particularly to such computer-implemented methods comprising convolutional neural networks.

BACKGROUND

Infrastructures in Canada and many other places worldwide are subjected to gradual deterioration due to continuously repeated loading and aging. Bridge systems experience a gradual loss of structural integrity, particularly bridge decks, because they are exposed to cracks and delamination due to traffic loadings, fatigue, freeze—thaw cycles, and de-icing salts [1]. Subsurface delamination in reinforced concrete bridge deck slabs is mainly caused by the corrosion of the rebar reinforcement [2]. Subsurface delamination leads to the expansion of the reinforcement, exerting local stresses on the concrete and eventually generating cracks along the reinforcement in concrete [3]. Another significant issue is the internal delamination in concrete, which is not visible and further accelerates deterioration by exposing the reinforcement to adverse environmental conditions [4]. The aforementioned issues can eventually lead to sudden collapse. Therefore, early detection of internal damage, such as delamination and debonding, should be conducted to prevent severe deterioration and loss of integrity of structures [5, 6].

According to the ASTM D4580 [7], three different procedures can be used to detect delamination/debonding, namely, the use of electro-mechanical sounding devices, chain drag, and rotary percussion [8]. These methods differentiate between damaged and intact concrete using the principle of sound; that is, a sound that ranges from dull to ringing is emitted. The inspection results of these traditional techniques are highly affected by noises and vary depending on the inspectors [9]. In addition, these methods are time-consuming, labor-intensive, have low accessibility to specific areas of structural systems, are risky, and interrupt the flow of traffic for bridge deck cases [10]. To reduce maintenance costs, both surface and hidden damages are detected at the early stage to avoid the proliferation of deterioration [11].

Surface damages such as cracks, corrosion, and loosened bolts can be detected using computer vision. However, internal damages require non-destructive techniques, such as ground penetration radar [12, 13], ultrasonic tomography [14], impact echo [15, 16], half-cell potential [17], electrical resistivity [17], and infrared thermography (IRT) [18, 19, 20]. These techniques cover small areas and require experts to test and analyze the data. Yehia et al. [21] stated that IRT is the fastest technique in terms of data collection. However, the accuracy of IRT is vulnerable to the variations in field conditions, so inspectors find it difficult to localize the damaged zones within concrete [22]. Therefore, a fast, robust, and automated IRT image analysis method is required to detect and localize the internal damage of concrete specimens.

Previously, Cha et al. pioneered the detection of concrete surface cracks by designing a deep convolutional neural network (CNN) [24]. The deep CNN was further combined with autonomous unmanned aerial vehicle (UAV) using an ultrasonic beacon system in a global positioning system-denied environment for the geotagging of concrete crack detection [25, 26]. Other researchers have also applied deep CNN for crack detection [27, 28, 29, 30, 31, 32], automatic concrete spalling [33], and subsurface anomaly detection [34, 35]. In addition to cracks, Cha et al. applied a faster region-based CNN [37] to detect multiple types of damages, such as medium and high steel corrosion, bolt corrosion, concrete surface cracks, and surface delamination. Based on the successful implementation of deep learning for surface damage detection, Ali and Cha combined deep CNN with IRT for subsurface damage detection within structural steel members [39]. The deep learning technique developed was combined with multi-spectral dynamic images for concrete crack detection in concrete tunnels to distinguish between noise and cracks [40]. However, these methods use bounding boxes to detect and localize damages within input images, which is insufficient to accurately quantify the detected damage.

To overcome this limitation, pixel-level segmentation methods have been proposed to quantify the detected damage [41, 42]. These real-time crack segmentation methods can achieve a mean intersection over union (mIoU) of 0.846 with 0.160 million parameters and 37 frames per second (FPS) [41], and mIoU of 0.93 with 2 million parameters and 49 frame per second (FPS) [42], respectively. Several semantic segmentation algorithms have achieved remarkable results. However, many of them are still computationally expensive, such as BiseNet with 12.4 million parameters and CracksegNet [27] with 12.4 million parameters. Civil infrastructures are mostly inspected in the field. Therefore, a light-weight segmentation network with fewer parameters is the first step to reduce computational cost and, eventually, overall monitoring cost. However, no studies have focused on the pixel-level segmentation of internal damage in concrete. Moreover, no method has been developed to process thermal image-based internal damage segmentation in a real-time manner.

To realize the pixel-level segmentation of internal damage in real-time, well-established ground truth data with an infrared (IR) thermal camera are used in training the developed network to achieve a high level of segmentation accuracy. However, those data are very limited; it also takes a very long time to collect those data compared with the RGB images for surface damage detection. Although some data augmentation methods are available, most of them are focused on flipping and changing the color tone using various filters [44], which is very limited in terms of improving the segmentation accuracy (1%-2%). Recently, a generative adversarial network (GAN) [45] has been developed to generate training data using existing limited ground truth data. The original GAN uses input images with a size of 32×32 and some additional GANs [e.g., DCGAN [46], D2GAN [47], and Wasserstein GAN (WGAN) [48, 49]]

with an input image size of 64×64, which is too small for civil infrastructure monitoring.

SUMMARY OF THE INVENTION

It is an aspect of the invention to provide an internal damage segmentation network (IDSNet) to segment internal damages in concrete members using thermal images at the pixel level in a real-time manner. The internal damages targeted are delamination, debonding, cracks, voids, and honeycombing. IDSNet is a very light-weight network with 0.085 million learnable parameters to realize the real-time processing of IR thermal images (640×480×3) and achieve state-of-the-art segmentation performance. It is another aspect of the invention to provide an attention-based generative adversarial network (AGAN) to augment IR thermal images and train the IDSNet.

According to an aspect of the invention there is provided a computer-implemented method for analyzing an image to detect an article of interest, comprising:
receiving the image, wherein the image is thermographic;
processing the image using a machine learning algorithm configured to detect the article of interest, wherein the machine learning algorithm comprises a convolutional neural network;
and displaying the image with location of the article of interest being indicated if determined to be present by the convolutional neural network;
wherein the convolutional neural network comprises:
a first convolution module configured to receive the image and to extract features of the thermographic image to form a feature map, wherein the first convolution module comprises at least one convolution layer, wherein each convolution layer comprises a convolution operator, batch normalization and a nonlinear activation function;
a second convolution module after the first convolution module and configured to reduce size of the feature map, wherein the second convolution module comprises at least one convolution layer, wherein each convolution layer of the second convolution module comprises a convolution operator, batch normalization and a nonlinear activation function;
an average pooling module after the first convolution module and configured to receive an output of the first convolution module, wherein the average pooling module comprises at least one series of iterations of average pooling operators;
an in-depth module after the second convolution module and the average pooling module and configured to learn correlations and contextual features of the image, wherein the in-depth module receives, as input, an output of the second convolution module concatenated with an output of the average pooling module;
a final pointwise convolution layer after the in-depth module and configured to receive an output thereof;
a preliminary upsampling module after the final convolution layer and configured to receive an output thereof, wherein the preliminary upsampling module comprises one or more iterations of an upsampling operator;
a superficial module after the first convolution module and configured to receive the feature map thereof, wherein the superficial module comprises parallel depth-wise asymmetric convolution layers configured to extract features relevant to the article of interest; and
a secondary upsampling module after the superficial module and the preliminary upsampling module and configured to receive outputs thereof, wherein the secondary upsampling module comprises one or more iterations of an upsampling operator.

In the illustrated arrangement, the at least one convolution layer of the first convolution module comprises a plurality of convolution layers, and consecutive initial ones of the convolution layers at a beginning of the first convolution module have common filter sizes and a final one of the convolution layers has a different filter size than the consecutive initial convolution layers.

In the illustrated arrangement, the at least one convolution layer of the second convolution module comprises a single convolution layer with a smaller filter size than the at least one convolution layer of the first convolution module.

In the illustrated arrangement, the in-depth module comprises an in-depth convolution submodule including depth-wise asymmetric convolution layers and depth-wise dilated separable convolution layers, plural series of iterations of residual in-depth convolution submodules and one or more concatenation modules respectively configured to concatenate outputs of submodules of the in-depth module upstream thereof, wherein each of the residual in-depth convolution submodules comprises depth-wise asymmetric convolution layers and depth-wise separable dilated convolution layers, wherein an output of each residual in-depth convolution submodule includes an input thereto, wherein each subsequent one of the iterations in a respective one of the series of residual in-depth convolution submodules has a different dilation rate.

In one such arrangement, the plural series of iterations of residual in-depth convolution submodules comprises first and second series thereof, wherein the first series of iterations of residual in-depth convolution submodules is after the in-depth convolution submodule and the second series of iterations of residual in-depth convolution submodules is after the first series thereof and has different filter sizes than the residual in-depth convolution submodules of the first series.

In one such arrangement, the plural series of iterations of residual in-depth convolution submodules comprises first and second series thereof, wherein the first series of iterations of residual in-depth convolution submodules is after the in-depth convolution submodule and the second series of iterations of residual in-depth convolution submodules is after the first series thereof and has different filter sizes than the residual in-depth convolution submodules of the first series.

In one such arrangement, when the at least one series of iterations of average pooling operators of the average pooling module comprises first and second series thereof having different filter sizes and said first series, with larger filter size than said second series, forms the output of the average pooling module that is concatenated with the output of the second convolution module to form the input of the in-depth module, the one or more concatenation modules comprises a first concatenation module between the first and second series of iterations of residual in-depth convolution submodules such that an output of the first concatenation module is an input to the second series of iterations of residual in-depth convolution submodules, wherein the first concatenation module is configured to receive, as input, an output of the in-depth convolution submodule, an output of the first series of iterations of residual in-depth convolution submodules and the second series of average pooling operators of the average pooling module.

In the illustrated arrangement, when the second series of iterations of residual in-depth convolution submodules comprises first and second iterations thereof, the one or more concatenation modules of the in-depth module comprises a second concatenation module after the second series of iterations of residual in-depth convolution submodules and configured to receive, as input, respective outputs of the first and second iterations of the second series of iterations of residual in-depth convolution submodules.

In the illustrated arrangement, the in-depth convolution submodule is a first module of the in-depth module.

In the illustrated arrangement, the in-depth convolution submodule comprises plural iterations of a sub-submodule including one of the depth-wise asymmetric convolution layers and one of the depth-wise separable dilated convolution layers after said depth-wise asymmetric convolution layer and including a depth-wise dilated convolution and a pointwise convolution thereafter, wherein a dilation rate of each subsequent one of the iterations is different.

In one such arrangement, the in-depth convolution submodule comprises plural parallel operations each comprising the plural iterations of the sub-submodule, wherein the dilation rates of the depth-wise asymmetric and separable dilated convolution layers of the parallel operations are different, and wherein, in at least one of the plural parallel operations, the dilation rate of each subsequent iteration of the sub-submodule is the same.

In one such arrangement, an output of the in-depth convolution submodule is a concatenation of outputs of the parallel operations.

In the illustrated arrangement, the in-depth convolution submodule includes a convolution layer before the plural iterations of the sub-submodule.

In the illustrated arrangement, each of the residual in-depth convolution submodules comprises plural parallel operations, one of which includes a convolutional layer and another two of which include one of the depth-wise asymmetric convolution layers and one of the depth-wise separable dilated convolution layers after said depth-wise asymmetric convolution layer and including a depth-wise dilated convolution and a pointwise convolution thereafter, wherein dilation rates of said another two of the parallel operations are different.

In one such arrangement, an output of each residual in-depth convolution submodule is a concatenation of outputs of the parallel operations thereof.

In the illustrated arrangement, each residual in-depth convolution submodule includes a pointwise convolution before the parallel operations.

In the illustrated arrangement, the superficial module further includes convolution layers respectively after the parallel depth-wise asymmetric convolution layers.

In one such arrangement, outputs of the convolution layers after the parallel depth-wise asymmetric convolution layers are summed and a pointwise convolution is applied thereto.

In one such arrangement, an output of the pointwise convolution is summed with an input of the superficial module to form an output of the superficial module.

In the illustrated arrangement, the superficial module includes a convolution layer before the depth-wise asymmetric convolution layers.

In the illustrated arrangement, the superficial module is consecutively iterated.

According to another aspect of the invention there is provided a computer-implemented method for generating, based on authentic training data, synthetic training data for training an artificial neural network, the computer-implemented method comprising:

performing a plurality of iterations of:

using a first neural network, generating one or more pieces of the synthetic training data based on random input noise;

wherein the first neural network comprises:

a plurality of transpose convolution layers, wherein each convolution layer comprises a transpose convolution operator, batch normalization and a nonlinear activation function, wherein an initial one of the convolution layers is configured to receive the random input noise; and at least one attention module intermediate respective ones of the convolution layers, wherein each of the at least one attention module is configured to determine dependencies of features extracted by earlier ones of the convolution layers preceding a respective one of the attention module;

using a second neural network, receiving the generated synthetic training data and comparing to the authentic training data to determine a realness score representative of closeness of the synthetic and authentic training data, wherein the second neural network comprises:

a plurality of convolution layers wherein each convolution layer comprises a convolution operator, batch normalization and a nonlinear activation function, wherein an initial one of said convolution layers is configured to receive an input comprising the generated synthetic training data and the authentic training data; and at least one attention module intermediate respective ones of the convolution layers of the second neural network, wherein each of the at least one attention module is configured to determine dependencies of features extracted by earlier ones of the convolution layers preceding the attention module;

wherein, in each of the iterations after a first iteration, the realness score determined by the second neural network is provided as input to the first neural network additional to the random input noise.

In the illustrated arrangement, the at least one attention module of the first neural network comprises a plurality of non-consecutive attention modules.

In the illustrated arrangement, the attention modules are separated by one of the convolution layers.

In the illustrated arrangement, the at least one attention module of the second neural network comprises a plurality of non-consecutive attention modules.

In one such arrangement, the attention modules are separated by one of the convolution layers.

In the illustrated arrangement, the attention modules of the first and second neural networks are the same.

In the illustrated arrangement, the second neural network further comprises a global average pooling squeeze-and-expansion-based attention operator before the at least one attention module, wherein an output of the squeeze-and-excitation is provided as input to a later one of the convolution layers after the at least one attention module.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

With reference to the accompanying figures, there are shown computer-implemented methods for analyzing, using machine learning, a thermographic image to detect an article of interest, such as a defect in a surface, for example a crack, and for training a machine learning algorithm therefor. The arrangement for analyzing the thermographic image to detect an article of interest using machine learning, which for convenient reference may be referred to hereinafter as IDSNet, is particularly suited for application to images of defects in surfaces, and in particular cracks in concrete.

Figure 1:
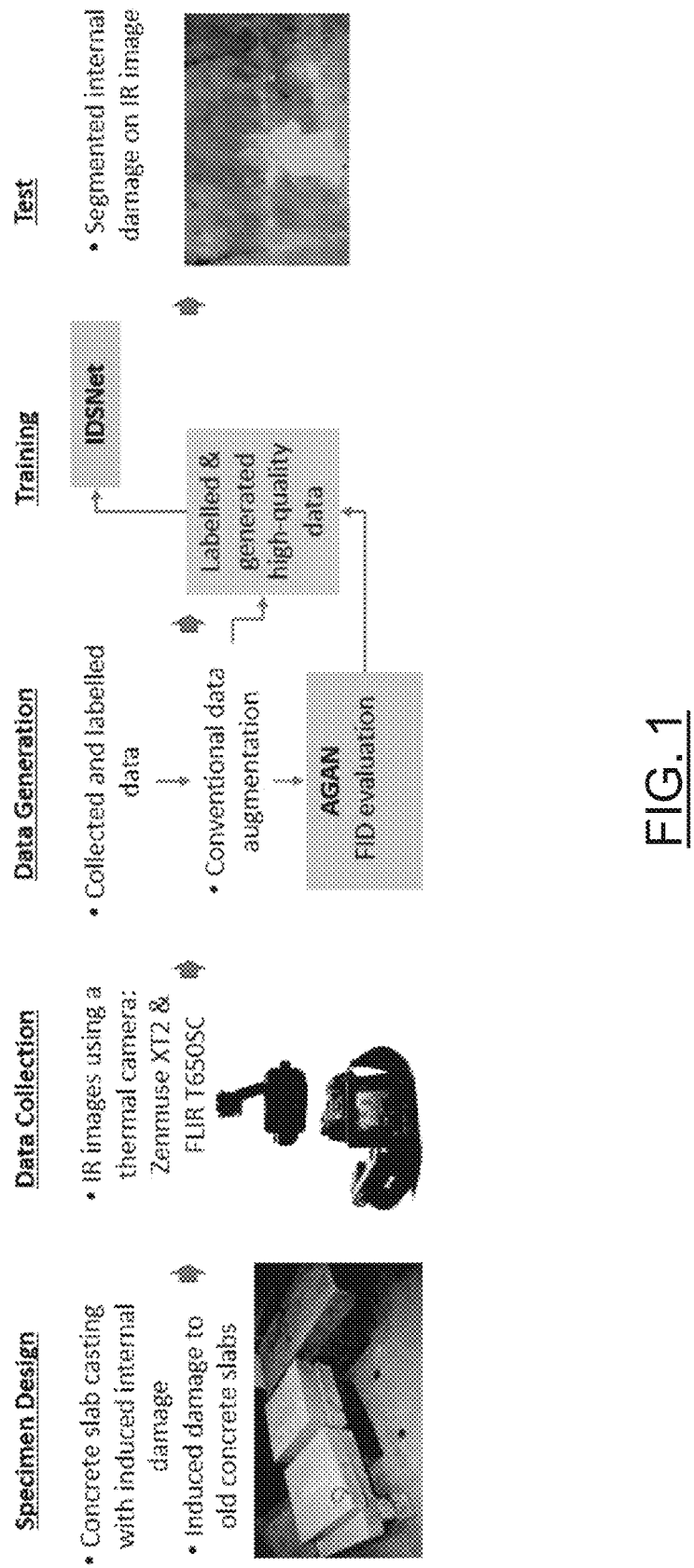
FIG. 1 is a schematic diagram of an approach or method for detecting a defect in a surface, specifically a crack, using an arrangement of computer-implemented method to analyze an image to detect an article of interest according to the present invention.

To segment the internal damage of concrete members of civil infrastructures at the pixel level in a real-time manner, an advanced light-weight IDSNet explicitly designed for thermal images is disclosed. Due to the lack of ground truth data to train the proposed IDSNet, an attention-based generative adversarial network (which for convenient reference may be referred to hereinafter as AGAN), based on the concept of a generative adversarial network (GAN) with an attention mechanism to generate infrared (IR) images that will be used as the training dataset for the IDSNet, is also disclosed, as shown in FIG. 1. To realize this, IR image data was collected from new and old concrete specimens to have a robust segmentation accuracy regardless of the ages of the structures using two thermal cameras [i.e., Zenmuse XT2 [50] and FLIR T650Sc [51]]. The initially collected IR images were labeled accurately, augmented by traditional image augmentation algorithms, and then fed into the AGAN to generate further training data. Eventually, the generated training data are used for training the IDSNet for internal damage detection.

As shown in FIG. 1, an overall approach or method for implementing or applying the arrangement of the present invention, specifically in respect of defects in the form of cracks in concrete, comprises steps of:

1) Specimen design: concrete slab casting with induced internal damage, and induced damage to old concrete slabs, based on which training data is to be formed;
2) Data collection: capturing infrared or thermographic images using a camera configured to capture thermographic images;
3) Data generation: labelling the training data and performing data augmentation using conventional techniques and AGAN to form high-quality data;
4) Training: training IDSNet based on the generated training data from step 3; and
5) Testing or implementation: applying IDSNet to analyze an image containing an article of interest of the same type as the training data set (but not in the data set).

Figure 2:
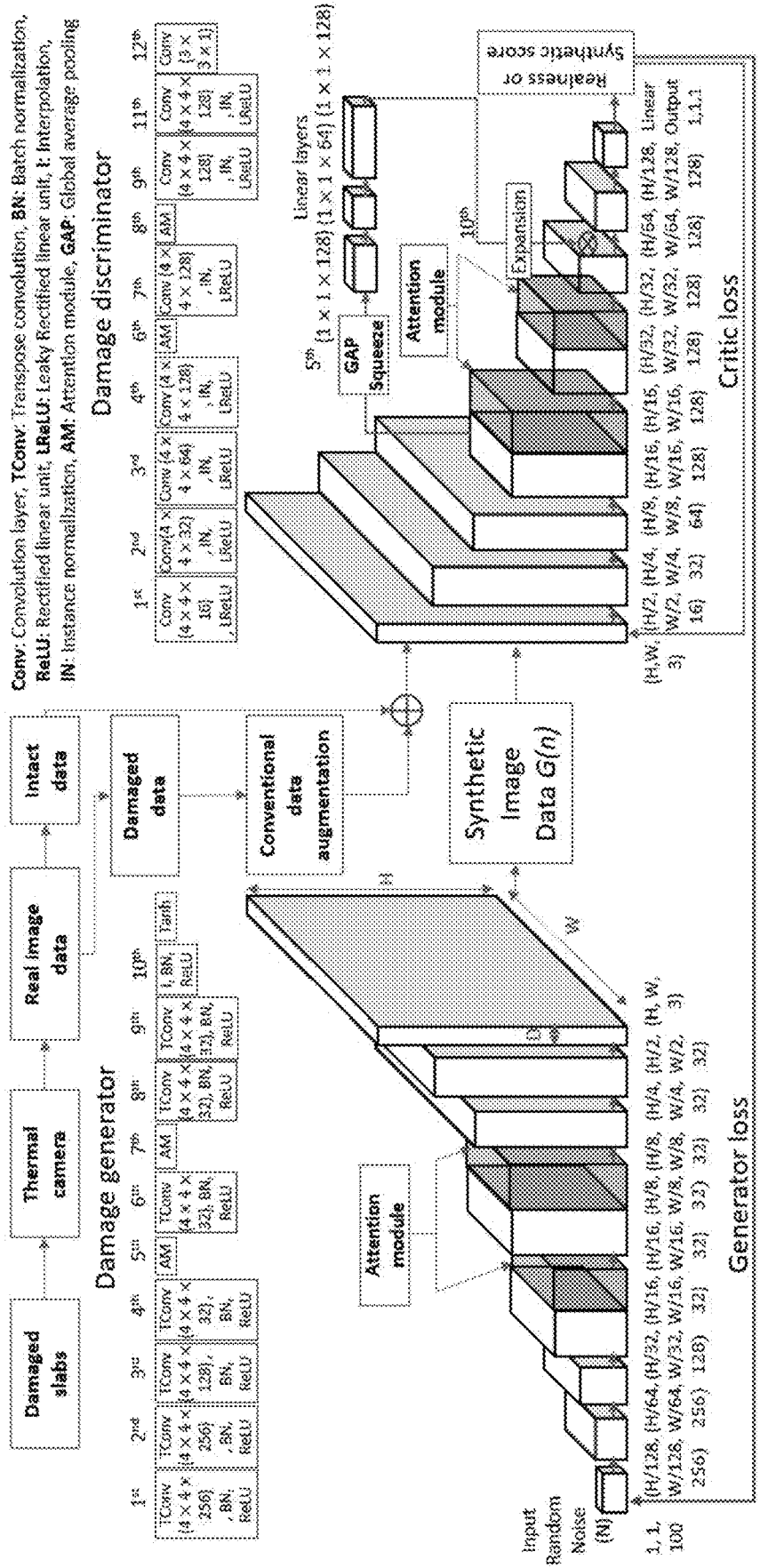
FIG. 2 is a schematic diagram showing detailed architecture of an attention-based generative adversarial network of the arrangement of computer-implemented thermographic image analysis method of FIG. 1.

AGAN is developed to generate new data using a limited number of ground truth data collected through experiments using thermal cameras. The network consists of a damage generator and a damage discriminator, as shown in FIG. 2. Both generator and discriminator are competitive and cooperative networks. To develop this efficient AGAN, the overall dimensions of the input, output feature sizes, and the number of hidden layers are newly assigned for the discriminator and the generator. The nearest neighboring interpolation technique was implemented in the generator to minimize tessellation and checkerboard effects. In addition, to improve the performance of the AGAN, the attention module is implemented in the generator and discriminator. The role of the self-attention module is to extract key features from the input features within the network and use these for learning long-term dependencies [52]. Two attention modules were implemented in the generator and two in the discriminator, as shown in FIG. 2. Global average pooling (GAP) is also implemented in the discriminator, with a key role of extracting useful features.

It will be appreciated that the following acronyms or abbreviations in FIG. 2 mean:
Corm convolution layer
TConv: transpose convolution
BN: batch normalization
ReLU: rectified linear unit
LReLU: leaky rectified linear unit I: interpolation
IN: instance normalization
AM: attention module
GAP: global average pooling As the first step, traditional data augmentation is conducted, which includes the blur effect with different kernel sizes and rotation of the images using different angles, such as 30°, 90°, 180°, and 270°, as shown in FIG. 2. This data augmentation increases the diversity of the ground truth data for robust performances of the AGAN and IDSNet for internal damage segmentation. The size of the input image of this discriminator is 640×480×3 in height (H), width (W), and depth (D), respectively, as shown in FIG. 2. The damage discriminator processes an input image with a convolution (Conv) having a filter size of 4×4×D with stride 2. The "Damage discriminator" takes the input (H, W, D) from the ground truth data with/without internal damages collected from the damaged slabs or their augmented data. The damage discriminator consists of eight Conv layers with an attention module and a GAP. The final linear output of the discriminator (1×1×1) is produced to determine the realness score of the input.

Also, in the discriminator, a GAP was implemented to perform global average pooling operations on the width and height of the feature of the fourth block. The GAP squeezes the fourth block and outputs 1×1×128 to extract useful features from the fourth block. The output of the linear layers is multiplied by the output of the ninth block. Each Conv layer in the "Damage discriminator" is followed by instance normalization (IN) and a leaky rectified linear unit (LReLU). The mathematical equation of Conv is presented in Equation (1). Meanwhile, IN is presented in Equation (2), with the mean ($\mu_{nc}$) and variance ($\sigma_{nc}$) in Equations (3) and (4), respectively. The activation functions used in this network are presented in Equations (5), (6), and (7), respectively.

$$\text{out}(N_i, D_{outj}) = \text{bias}(D_{outj}) + \sum_{k=0}^{D_{in}-1} \text{weight}(D_{outj}, k)(N_i, k) \quad (1)$$

$$IN = \frac{x - \mu_{nc}}{\sqrt{\sigma_{nc}^2 + \epsilon}} \quad (2)$$

$$\mu_{nc} = \frac{1}{HW}\sum_{j=1}^{H}\sum_{k=1}^{W} x_{ncjk} \quad (3)$$

$$\sigma_{nc}^2 = \frac{1}{HW}\sum_{j=1}^{H}\sum_{k=1}^{W} (x_{nck} - \mu_{nc})^2, \quad (4)$$

where N is the batch size, n is the count number of samples in the batch, c is the count number of channels in the sample, H is the height, W is the width, D is the depth of the channel, k is the kernel size, $\mu$ is the mean, $\sigma$ is the variance, and $\epsilon$ is to avoid numerical instability.

$$ReLU = \begin{cases} x \text{ for } x > 0 \\ 0 \text{ for } x \leq 0 \end{cases} \quad (5)$$

$$LReLU = \begin{cases} x \text{ for } x \geq 0 \\ ax \text{ for } x < 0 \\ a = \text{constant} \end{cases} \quad (6)$$

$$PReLU = \begin{cases} x \text{ for } x \geq 0 \\ ax \text{ for } x < 0 \\ a = \text{trainable} \end{cases} \quad (7)$$

Figure 3:
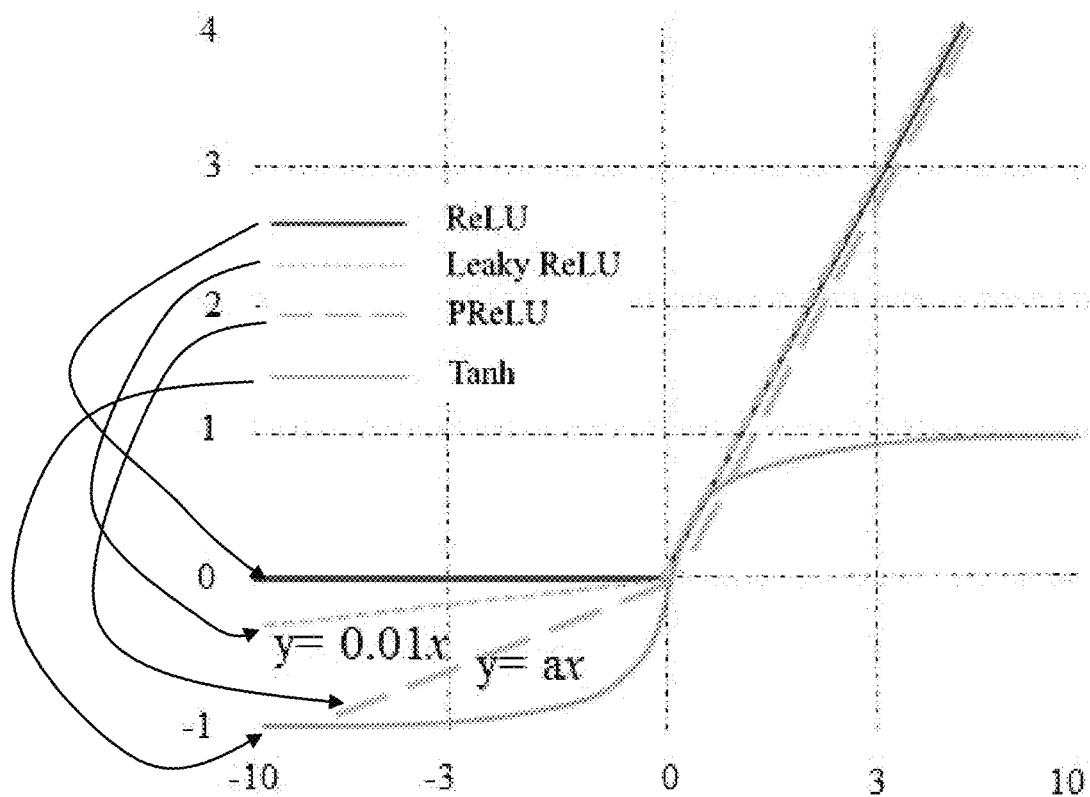
FIG. 3 shows nonlinear activation functions used in the arrangement of FIG. 1.

PReLU has a trainable parameter, whereas LReLU has a constant parameter ranging from 0 to 1, as shown in FIG. 3. The mean and variance are computed in IN for each channel for each separate sample across both spatial dimensions. FIG. 3 depicts the nonlinear activation functions used in this disclosure.

In AGAN, the input random noise was fed to the "Damage generator." The input random noise (1×1×100) from a normal distribution with a mean µ equal to 0 and a standard deviation σ equal to 1, which is also referred to as standard normal distribution $\mathcal{N}$ (0, 1), was used. The damage generator consists of transpose convolutions (TConv) with stride 2, BN, and ReLU generating a synthetic image from the noises. The output (G(n)) of the generator, which is a synthetic image, is fed into the damage discriminator that processes the image and outputs the realness score.

The BN is presented in Equation (8), with the mean ($\mu_{nc}$) and variance ($\sigma_{nc}$) in Equations (9) and (10), respectively.

$$BN = \frac{x - \mu_c}{\sqrt{\sigma_c^2 + \epsilon}}, \quad (8)$$

$$\mu_c = \frac{1}{NHW}\sum_{i=1}^{N}\sum_{j=1}^{H}\sum_{k=1}^{W} x_{icjk}, \quad (9)$$

and $$\sigma_c^2 = \frac{1}{NHW}\sum_{i=1}^{N}\sum_{j=1}^{H}\sum_{k=1}^{W} (x_{icjk} - \mu_c)^2, \quad (10)$$

where N is the batch size, H is the height, W is the width, D is the depth of the channel, k is the kernel size, µ is the mean, σ is the variance, and ϵ is to avoid numerical instability. In the AGAN generator, the first TConv with a kernel size of 4×4×D was used, followed by BN and ReLU. In the final layer before the Tanh activation function, the nearest neighboring interpolation (I) [53] is also used to generate a large image. The output (G(n)) of the generator is a synthetic image fed into the damage discriminator that processes the image and outputs the realness score.

Figure 4:
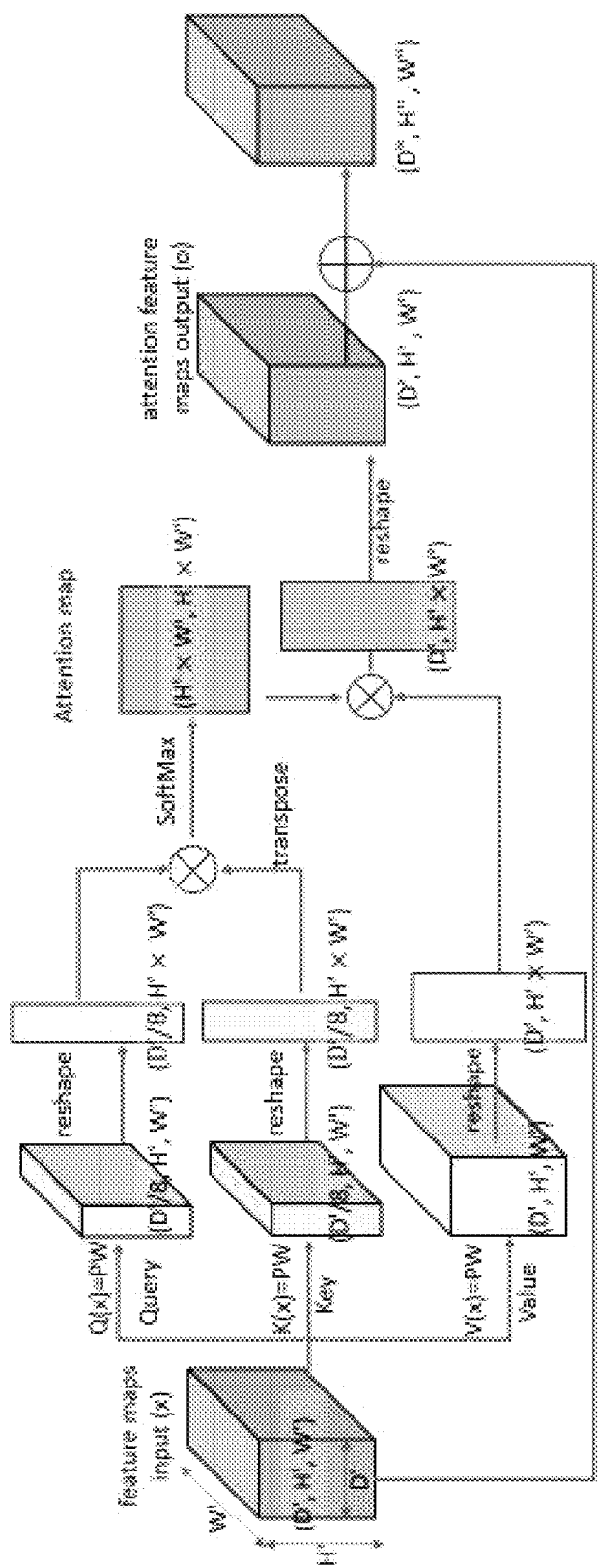
FIG. 4 is a schematic diagram of an attention module of the arrangement of FIG. 1.

An attention module is implemented in the discriminator and generator, as shown in FIG. 2. The details of the attention module are illustrated in FIG. 4. The role of the attention module is to capture global and long-range dependencies by explicitly learning the relationship between one pixel and all other positions in the extracted features.

The attention module receives a feature map from the previous Conv or TConv layer. This input is further processed by three pointwise (PW) convolutions, namely, Query Q(x), Key K(x), and Value V(x). The depth of the channel is decreased by 8 in Query and Key to reduce the computational cost. The Query (D'/8, H', W'), Key (D'/8, H', W'), and Value (D', H', W') are reshaped from 3D to 2D using a View, which is an embedded function of PyTorch. The Query (D'/8, H'×W') is first transposed to (H'×W', D'/8) and then multiplied by the Key (D'/8, H'×W') based on matrix multiplication, followed by a SoftMax function. The Query and Key multiplications are symbolized by ⊗, as shown in FIG. 4. The output is the first attention map (H'×W', H'×W'), which is again multiplied by the Value (D', H'×W'), and a View function is applied to recover its original size. The output (D', H', W') has rich features containing useful information, and the unnecessary or erroneous information is screened and removed. An element-wise summation operation is conducted to produce the final feature map (D", H", W").

The key advantage of the attention module in AGAN is that it overcomes the issue of a limited receptive field, and it is designed to learn the relationships between one pixel and all other regions in the input feature. The design of the attention module helps in connecting similar features regardless of their spatial distances. The attention module efficiently improves and captures the long-range and global dependencies compared with the convolution process, which processes information in a local neighborhood.

In this disclosure, a Wasserstein loss (W-loss) function [49], which does not merely discriminate between real and synthetic data but instead calculates the Wasserstein distance between the generated synthetic data distribution (Ps) and the real data distribution (Pr), was implemented. The Wasserstein critic loss is given in Equation (11) below.

$$\text{Loss} = \min_G \max_{D \in \mathcal{D}} (E_{x \sim P_r}[D_w(x)] - E_{n \sim P_s}[D_w(G_\theta(n))]), \quad (11)$$

where $E_{x \sim P_r}[D_w(x)]$ is the expected value or critic score on real images and $E_{n \sim P_s}[D_w(G_\theta(n))]$ is the expected value or critic score on the fake images. $\min_G$ shows that the generator tries to minimize the above loss expression to make the generated image as close as possible to the real image sample. $\max_D$ shows that the discriminator wants to maximize the expression in Equation (11) to differentiate between the real and synthetic image. x is the sample from the real data, E is the expectation of the data, θ represents the initial generator's parameters, w represents the initial critic parameters, and $\mathcal{D}$ is the set 1-Lipschitz function.

The W-loss was implemented because the simple GAN is susceptible to mode collapse and training instability. For training GAN with W-loss, the critic has a special condition: it should have 1-Lipschitz Continuity (LC). For the critic loss to be 1-LC, the norm of the gradient should be at most 1 for every point, which means that the slope cannot be greater than 1 at any point. This special critic condition ensures that the W-loss is continuous and differentiable, as well as to maintain stability during training.

Two methods can be utilized to ensure the 1-LC condition: weight clipping (WC) and gradient penalty (GP). The WC method enforces the weights of the critic to a fixed interval, which means that the critic weights are within a space of thresholds (c) [−c, c]. However, Arjovsky et al. [48] posited that the WC method of enforcing 1-LC limits the learning ability of the critic, which is a disadvantage of WC. The WC method of implementing LC includes imposing thresholds c on the weights (w) of the discriminator ($D_w$). Thus, |w|<(c), w>(c), and w<−c would be considered as w, c, and −c, respectively. This means that if the value is greater than c, it would be automatically considered as c, whereas if it is less than −c, then it would be considered as −c. However, this procedure of enforcing LC is time-consuming and could easily lead to vanishing gradients when a maximum number of layers is used.

To resolve this issue, an approach of WGAN with GP was introduced by Gulrajani et al. [49], which has satisfactory results and is the softer version of enforcing 1-LC. This approach implements a penalty on the gradient norm of critic output for random samples. The generator ($G_\theta$) loss for WGAN with GP is $E_{n \sim P_s}[D_w(G_\theta(n))]$. The critic loss for WGAN with GP is presented in Equation (12) below.

$$\text{Critic Loss } GP = \min_G \max_{D \in \mathcal{D}} (E_{x \sim P_r}[D_w(x)] - E_{n \sim P_s}[D_w(G_\theta(n))] + \lambda E_{\tilde{n} \sim P_b}[(\|\nabla_{\tilde{n}} D_w(\tilde{n})\|_2 - 1)^2]). \quad (12)$$

WGAN was specifically adopted with a gradient penalty for demonstrating better performance in generating data. The $\lambda E_{\tilde{n} \sim P_b}[(\|\nabla_{\tilde{n}} D_w(n)\|_2 - 1)^2]$ is the GP part of the loss, ∇ is the operator for gradient, and X is the penalty coefficient or hyperparameter of how much weight should be assigned to the regularization term $E_{\tilde{n} \sim P_b}[(\|\nabla_{\tilde{n}} D_w(\tilde{n})\|_2 - 1)^2]$, which penalizes the critic when the gradient norm is higher than 1. $(\|\nabla_{\tilde{n}} D_w(\tilde{n})\|_2$ is the $L_2$ norm of the gradient and ñ is the random interpolated image between the real and synthetic images. The interpolated image is obtained by the weighted sum of the real and synthetic images. Pb is the uniform distribution obtained from points between Pr and Ps (i.e., real and synthetic data distribution).

Figure 5:
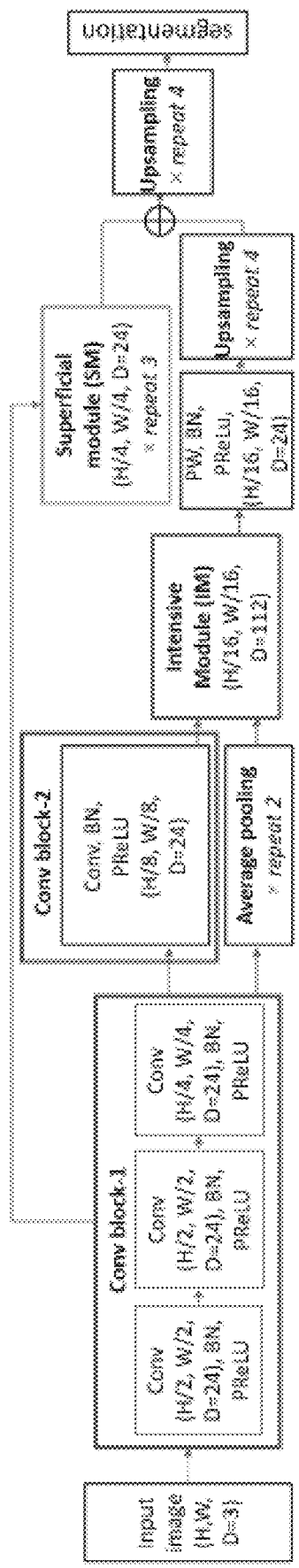
FIG. 5 is a schematic diagram of an overall architecture of the arrangement of FIG. 1.

A light-weight IDSNet is developed to segment damages in the thermal image of concrete using an IR thermal camera. To improve the segmentation accuracy and reduce computational cost simultaneously, the IDSNet architecture is carefully designed by the integration of a Conv block, intensive module (IM) (which may alternatively be referred to as an in-depth module), superficial module (SM), and upsampling blocks, as shown in FIG. 5. The overall scheme of the proposed IDSNet is that it processes an input image by Conv block-1, Conv block-2, average pooling, ICM, and SM. IM and SM recover the resolution by up-sampling bilinear operations in the two modules. Both modules are incorporated using element-wise addition. The role of average pooling is to reduce the spatial size of the extracted features from the Conv block and feed it into the IM. The role of the developed IM is to learn complex correlations, as well as global and contextual features in the input. Similarly, the SM is uniquely designed in IDSNet with a key role to extract spatial features.

The convolution block consists of 3×3×3 convolutions, followed by batch normalization (BN) and PReLU. This block is intended to extract initial low-level features from the input image that has the same features as those of the AGAN (i.e., H, W, and D). Two Conv blocks (i.e., Conv block-1 and Conv block-2) are assigned. The role of Conv block-1 is to extract low-level features and reduce the spatial dimension of the input image (H, W, D) by 4. The high-resolution (H/4, W/4, D=24) are fed to the superficial module. The Conv block-1 output is also fed to Conv block-2, where the spatial dimensions (H/4, W/4, D=24) are further reduced into (H/8, W/8, D=24) before inputting into the ICM.

Figure 6:
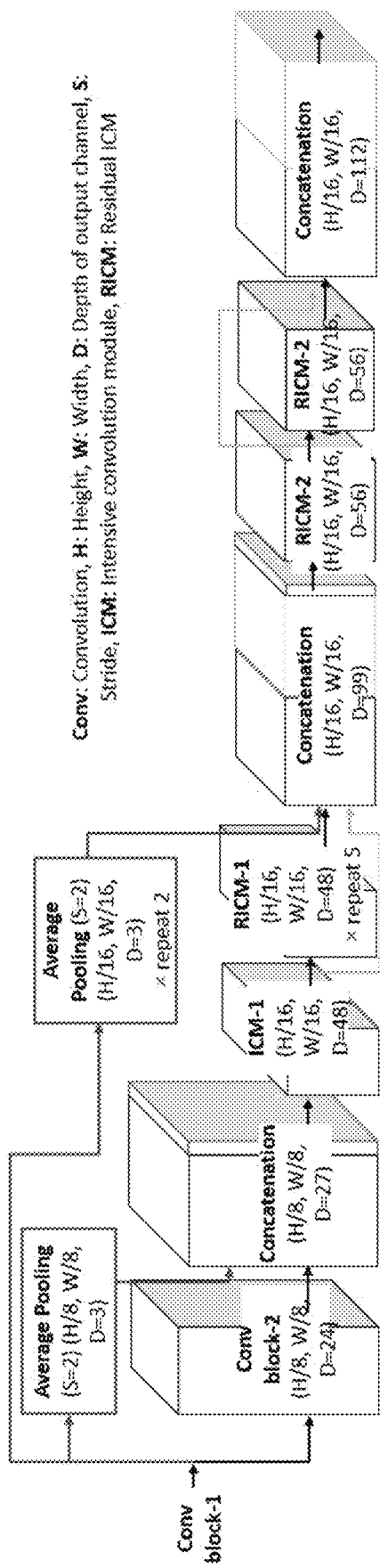
FIG. 6 is a schematic diagram of an in-depth module, which may alternatively be referred to as an intensive module, of the arrangement of FIG. 1.
Figure 7A:
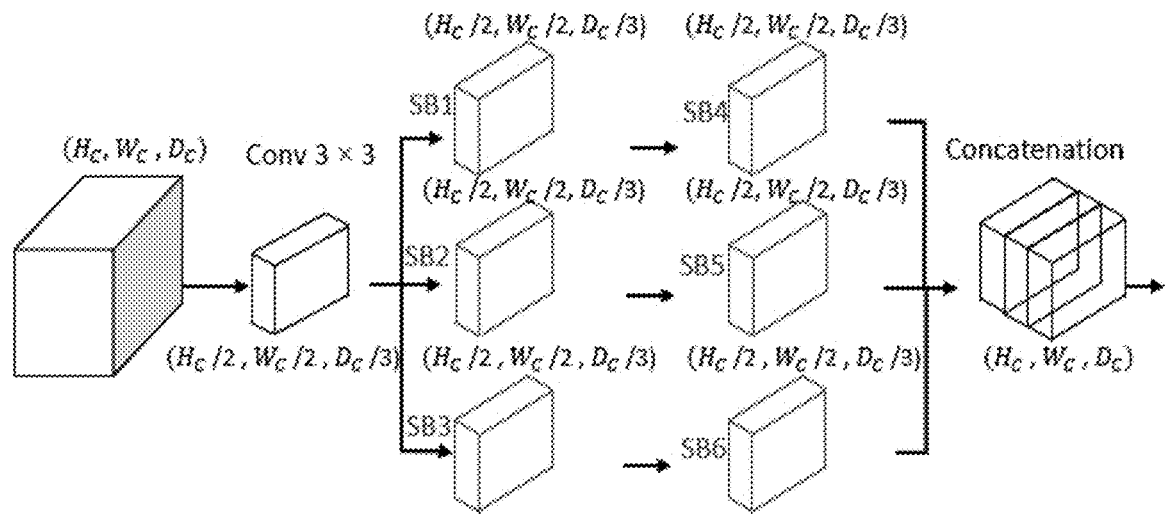
FIGS. 7A and 7B are schematic diagrams of intensive convolution and residual intensive convolution modules, respectively, of the in-depth or intensive module of FIG. 6.
Figure 7B:
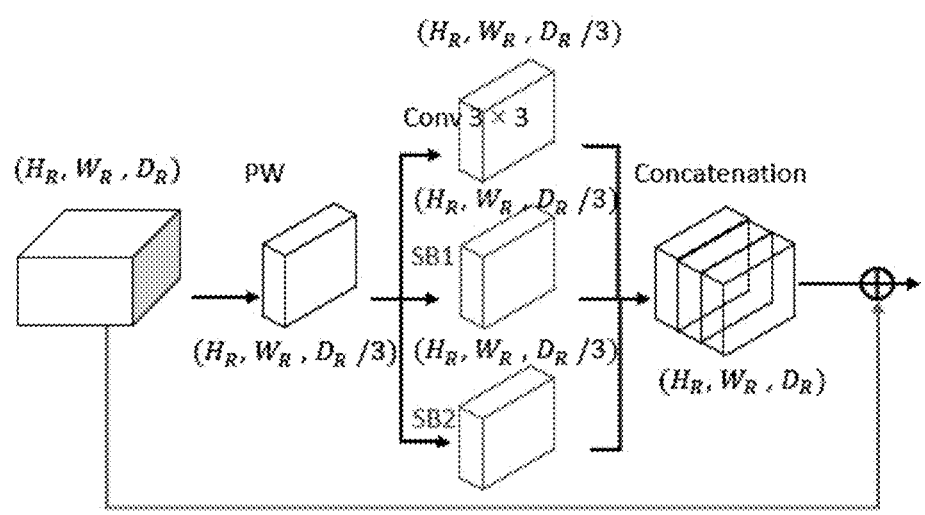

The IM is designed by the integration of traditional Conv, an intensive convolution module (ICM), and a residual ICM (RICM), as shown in FIG. 6. The key role of IM is to learn complex correlations and contextual features in the input. The details of the ICM and RICM are illustrated in FIGS. 7A-7B. A total of one ICM and seven RICM is used in the IM. In the IM, the output of the Conv block is concatenated with the output of the average pooling, which is then inputted into the ICM. The output of the ICM is further fed into the RICM module. The RICM module is repeated five times with different dilation rates, and the output of the final RICM is concatenated with the output of the ICM and average pooling. The concatenation and residual connection are used throughout the IM.

It will be appreciated that the following acronyms or abbreviations in FIG. 6 mean:
Conv: convolution
H: height
W: width
D: depth of output channel
S: stride
ICM: intensive convolution module
RICM: residual ICM (intensive convolution module)

The details of the designed ICM are illustrated in FIG. 7A. The role of ICM is to prevent feature loss by implementing depth-wise asymmetric convolutions (DWAC) before applying depth-wise dilated convolution (DWDC) because the latter may lose some relevant features due to its improper dilation rate. ICM reduces the height and width of the input in half, and the depth of the channel is reduced by one-third using a 3×3 convolution with a stride 2. The output is then inputted to the three sub-blocks (SB) (i.e., SB1, SB2, and SB3). The outputs of three parallel SBs (i.e., SB1, SB2, and SB3) are fed to the other three parallel SBs (i.e., SB4, SB5, and SB6). The three SBs (i.e., SB4, SB5, and SB6) in ICM are concatenated to recover the original input size of the ICM (i.e., $H_C$, $W_C$, $D_C$). The schematic structure of the SB of an ICM is presented in FIG. 8. The dilated ratio (r) and other details of the ICM are presented in Table A(1). Each SB has a different r. The r for each layer is carefully selected in the ICM and RICM modules.

Figure 8:
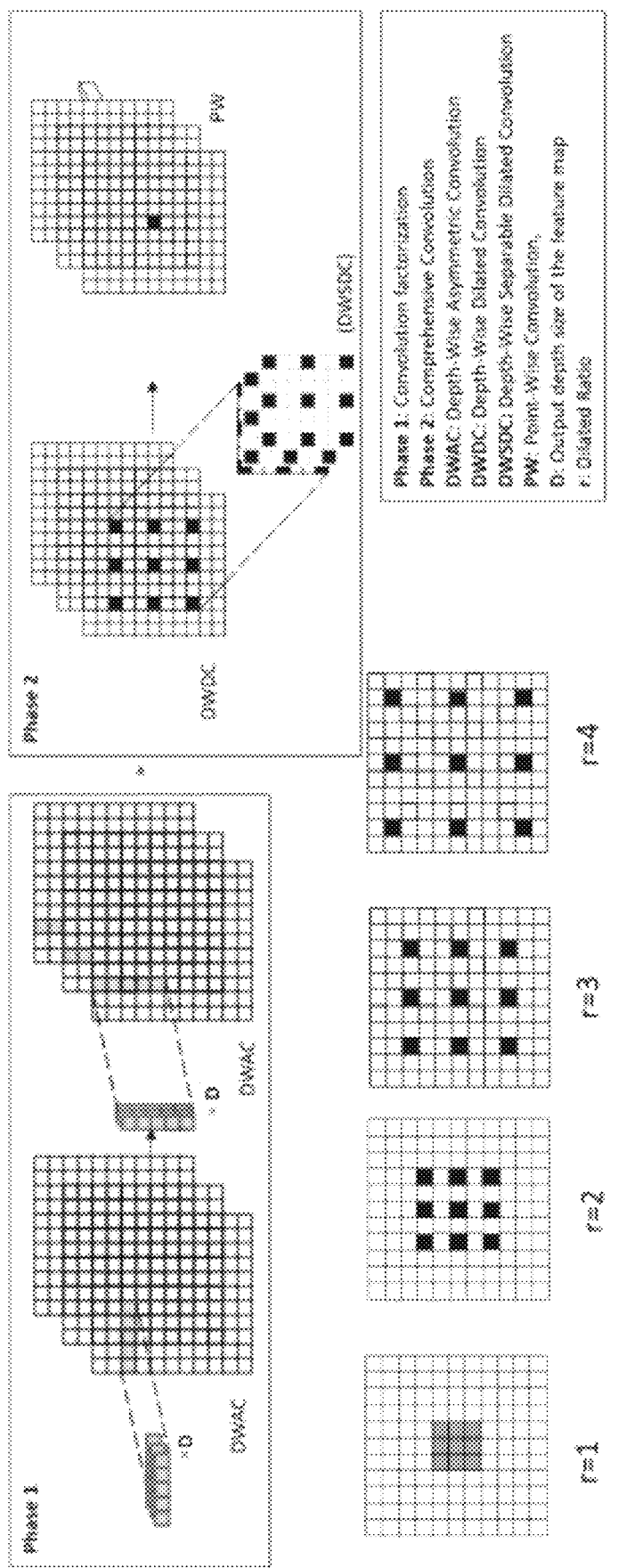
FIG. 8 schematically shows structure and dilation ratio of sub-blocks of the intensive convolution and residual convolution modules of FIGS. 7A and 7B.

FIG. 8 shows the two-phase approach of SB (i.e., Phase 1 and Phase 2). The benefit of the two-phase approach is that it entails a lesser possibility of feature loss and requires less computational cost. However, the simple implementation of dilated convolution increases the feature loss [54]. To solve this issue, a two-phase approach was implemented, where Phase 1 applied DWAC, and Phase 2 applied DWDC and PW [55, 56]. The key role of Phase 1 is to concentrate on the local feature information by implementing DWAC. In other words, Phase 1 may be referred to as convolution factorization. The role of Phase 2 is to extract global features by increasing the receptive field using different dilation ratios. In other words, Phase 2 may be referred to as comprehensive convolution. Therefore, smaller r values are selected in the first three SBs. For example, in SB1, SB2, and SB3, the values of r are 1, 2, and 3, respectively. Similarly, larger r values are selected in SB4, SB5, and SB6. The dilation in DWDC covers a large area with a wider receptive field, followed by a PW that mixes channel information. The ICM structure is expected to achieve both benefits of dilated convolution and depth-wise asymmetric convolution by accurately incorporating global and local information.

It will be appreciated that the following acronyms or abbreviations in FIG. 8 mean:
DWAC: depthwise asymmetric convolution
DWDC: depthwise dilated convolution
DWSDC: depthwise separable dilated convolution
PW: pointwise convolution
D: output depth size of the feature map
r: dilated ratio The details of the designed RICM are illustrated in FIG. 7B. The role of RICM is to incorporate simple Conv, DWAC, and larger r to extract both local and global features. The depth of the RICM channel is reduced by one-third before being fed to Conv 3×3, SB1, and SB2. Similar to ICM, RICM has two SBs running in parallel. The outputs of Conv 3×3 (i.e., $H_R$, $W_R$, $D_R/3$), SB1 (i.e., $H_R$, $W_R$, $D_R/3$), and SB2 (i.e., $H_R$, $W_R$, $D_R/3$) are concatenated (i.e., $H_R$, $W_R$, $D_R$), as shown in FIG. 7B. The concatenated output (i.e., $H_R$, $W_R$, $D_R$) is again added with the input feature (i.e., $H_R$, $W_R$, $D_R$) with a residual connection.

Equations (13)-(18) show the comparison of the number of parameters and computation cost for standard convolution (SC), DWAC, and depth-wise separable dilated convolution (DWSDC). The DWDC reduces the number of parameters compared with the SC. Equations (13) and (14) show the number of parameters (P) and computational cost for SC. Equations (15) and (16) show the number of parameters and computational cost for DWAC. Equations (17) and (18) show the number of parameters and computational cost for DWSDC.

$$SC_P = k^2 c_i c_o \tag{13}$$

$$SC_{cost} = k^2 c_i c_o wh \tag{14}$$

$$DWAC_P = 2kc_i + c_i c_o \tag{15}$$

$$DWAC_{cost} = 2whc_i(k+c_o) \tag{16}$$

$$DWSDC_P = k_r^2 c_i + c_i c_o \tag{17}$$

$$DWSD_{cost} = whc_i(k_r^2 + c_o) \tag{18}$$

where $k^2$ is the size of the filter, $k_r^2$ is the size of the filter for dilated convolution, r is the dilation rate, w and h are the width and height of the feature map, and $c_i$ and $c_o$ are the channel numbers of the input and output, respectively. In Equations (13)-(18), DWAC has a lesser number of parameters than DWSDC and SC. For example, considering k=3, $c_i$=10, $c_o$=10, w=100, and h=100, then DWAC has 5.6-fold lesser number of parameters than SC and 1.18-fold lesser number of parameters than DWSDC. Similarly, DWSDC has a 4.7-fold lesser computational cost than SC and a 1.36-fold lesser computational cost than DWAC.

Figure 9:
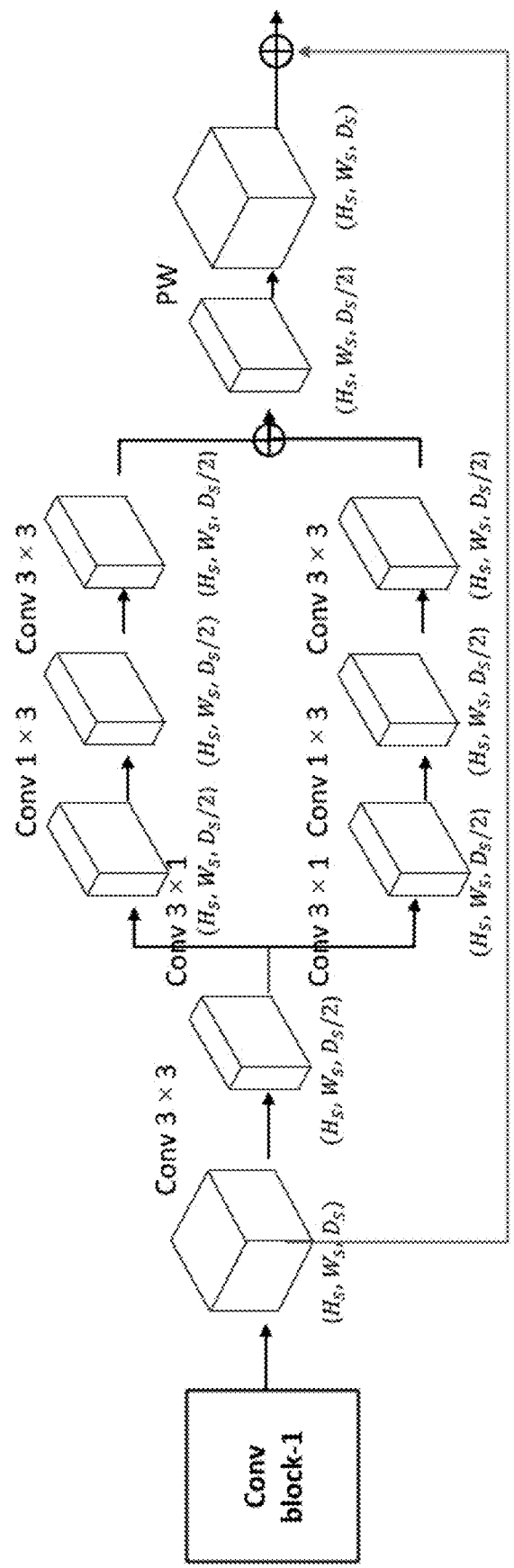
FIG. 9 is a schematic diagram of a superficial module of the arrangement of FIG. 1.

SM through an array of depth-wise asymmetric convolutions with different filter configurations. The key role of SM in the IDSNet is to extract the overall spatial features for spatially segmenting the boundaries of internal damages. In this SM, as shown in FIG. 9, a 3×3 Conv is first used on the input feature (i.e., $H_S$, $W_S$, $D_S$), and the depth of the input channel is reduced in half (i.e., $H_S$, $W_S$, $D_S/2$). A 3×3 Conv is adopted to accelerate the inference speed and reduce the layer number. This initial layer extracts local features and is followed by BN and PReLU functions.

Two parallel 3×1 and 1×3 asymmetric depth-wise convolutions are applied to the feature (i.e., $H_S$, $W_S$, $D_S/2$) to extract the corresponding information, as shown in FIG. 9. These depth-wise convolutions are designed for reducing computation cost further and maintaining accuracy. The computation cost is reduced by substituting a 3×1 and 1×3 asymmetric depth-wise convolution in place of the 3×3 convolution. The outputs are fed into the Conv 3×3, and the results are added together (i.e., $H_S$, $W_S$, $D_S/2$). A PW is applied to obtain the desired number of channels (i.e., $H_S$, $W_S$, $D_S$), as shown in FIG. 9. The output (i.e., $H_S$, $W_S$, $D_S$) is again added with the input (i.e., $H_S$, $W_S$, $D_S$) using the residual connection. All the layers are followed by BN and PReLU.

An IoU score is used to measure the quality of segmentation represented by Lovász-Softmax loss [57]. The Lovász-Softmax loss shows better performance than the general cross-entropy loss for IoU metric optimization. The formula of the Lovász-Softmax loss is presented in Equation (19).

$$\text{loss} = \text{Lovász}_{j \in G}(r_j, r^*) + \text{Lovász}_{j \in A_b}(r_j, r^*) \tag{19}$$

$$A_b = (kd) - (ke), \tag{20}$$

where (kd) is the morphological dilation, (ke) is the morphological erosion, and $A_b$ is the boundary area (the non-zero portion) which is the difference between (kd) and (ke). $r_j$ is the value of binary ground truth, $r^*$ is the predicted results from the model, G denotes the ground truth, and k denotes the kernel for morphological operations (i.e., dilation and erosion).

Regarding the procedures adopted during data collection from the slabs and data preparation, including data augmentation for training and testing the AGAN and IDSNet: The specimens cast with artificial internal damages are intended to replicate real structural damage conditions. To detect internal damages within concrete slabs, such as concrete delamination and internal cracks, the first step is to collect accurate ground truth data from the field. It is well known that deep learning networks require an extensive amount of data for training. However, collecting such data requires extensive investigations to sufficiently train the proposed network to detect internal damages. The higher the accuracy of the available data for training, the higher the testing results' accuracy.

Therefore, 16 concrete slabs were used for inducing internal damages artificially to collect thermal images for data preparation. Among the 16 slabs, 12 were cast in the laboratory with polystyrene sheets inside to induce artificial delamination. The internal damage in the slabs was produced using two different approaches. In the first approach, polystyrene sheets were placed inside the slabs during the casting of the concrete slabs at the different locations with different depths from the surface. Binding wires and spacers were used to place the polystyrene at the desired locations. This method was applicable for polystyrene having large thicknesses, such as 0.005 m or more. However, damages with small thicknesses were difficult to induce using polystyrene sheets, because it was difficult to keep its desired location and depth during the casting. Therefore, in the second approach, jackhammer and rotary hammer drills were used to damage the desired locations in the concrete slabs, and the polystyrene sheets with thicknesses less than 0.002 m were placed inside the damaged portions in the concrete specimens. The damaged portions of the slabs were repaired with the same concrete properties, and the entire surfaces of the slabs were covered with a cementitious layer to ensure uniformity.

Figure 10:
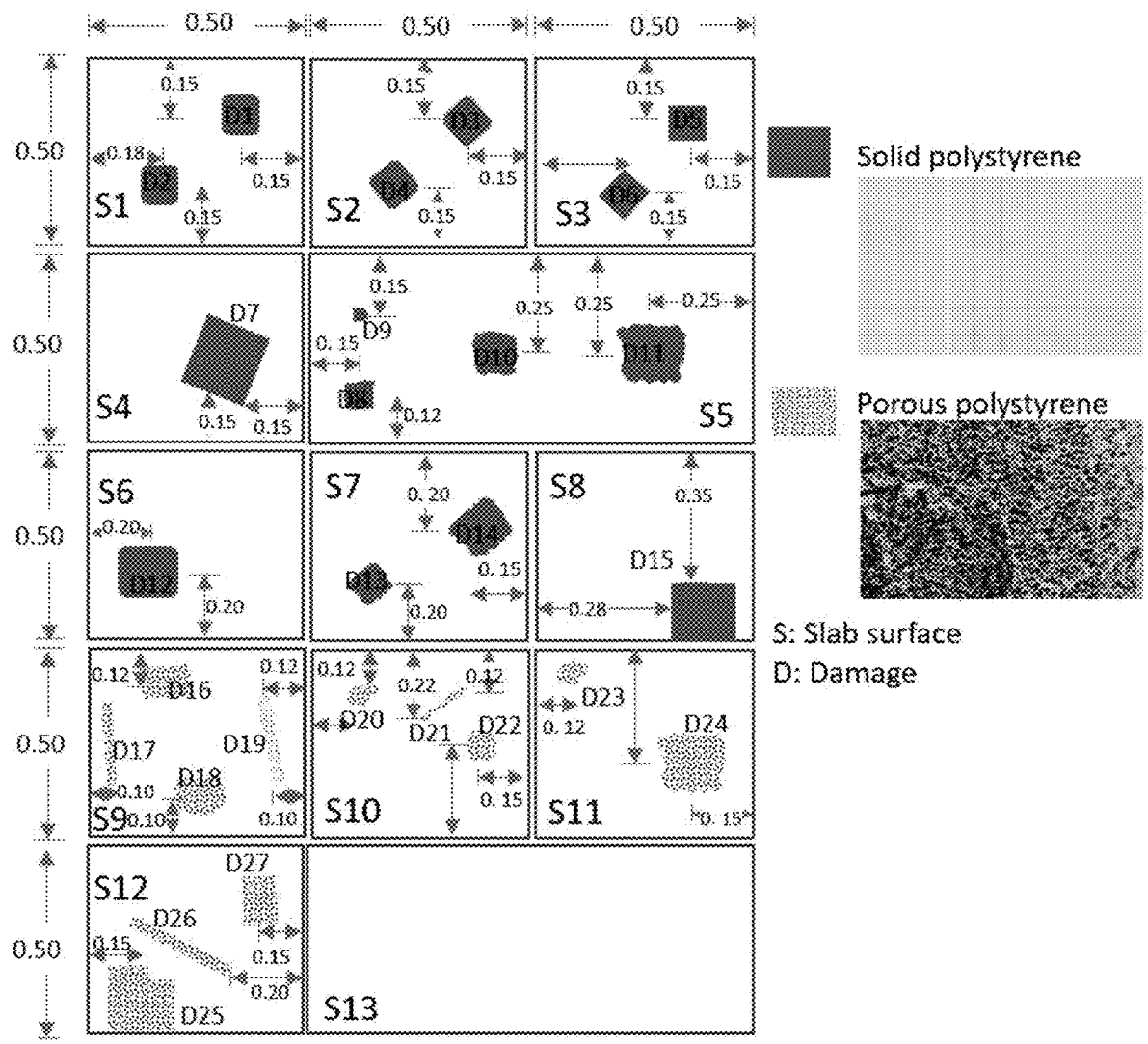
FIG. 10 shows examples of slabs with damage locations and geometry.

The damages inside concrete can take the form of delamination, cracks, voids, and honeycombing. For this reason, this disclosure used two different polystyrenes, i.e., solid polystyrene and porous polystyrene, of which actual reproductions and schematic representations are shown on the right upper hand side of FIG. 10 (larger and smaller illustrations, respectively). Solid polystyrene was used to replicate internal delamination, debonding, voids, and cracks, and the purpose of the porous polystyrene was to replicate honeycombing conditions. In addition, various geometrical shapes were included to diversify the developed technique for damage segmentation. The width of the polystyrene varied from 0.01 m to 0.15 m, the length varied from 0.06 m to 0.20 m, and the thickness varied from 0.0004 m to 0.01 m. FIG. 10 shows examples of the slabs (S) including the size of the slabs, geometry, location of the damages (D), and the type of polystyrene. S13 is an example of a slab with no internal damages. Additional details for each damage such as length, width, thickness, and depth from the surface, are tabulated in Table A(2). It will be appreciated that in FIG. 10 'S' denotes 'slab surface' and D' denotes damage.

Once the slab specimens were designed with internal damages, the next step was data collection. A handheld thermal camera [51] and a DJI Matrice-210 UAV Zenmuse XT2 thermal camera [50] were used to collect data from the slabs. The ground truth data were initially prepared using prior given information about the geometric shapes, sizes, and locations of the damages. The collected ground truth data were validated using ASTM D 4580 [7] and ASTM C 597 [59] tests. ASTM D 4580 includes the coin tape method, chain drag method, and hammer method. All these methods were used at the desired locations because they are common traditional methods conducted in the field. However, these are not sufficiently accurate. Therefore, ASTM C 597 was also conducted, which included an ultrasonic pulse velocity test (UPV). The UPV test provides the most accurate results, which were also used in [38] to validate the ground truth data. Small grid spacing and the direct transmission method of ASTM C 597 were adopted because of their highly satisfactory results. The error in UPV data compared to recorded data was less than 3%, and five readings were collected from each single grid. Subsequently, the mean value was used, which further minimized the chances of errors. The main problem with the direct UPV test method is that it requires a significant amount of time to cover a small portion of the structure. The UPV method is reliable; however, this method requires two hours to cover a small area (0.120 m×0.440 m) of the structural member [38].

Figure 11A:
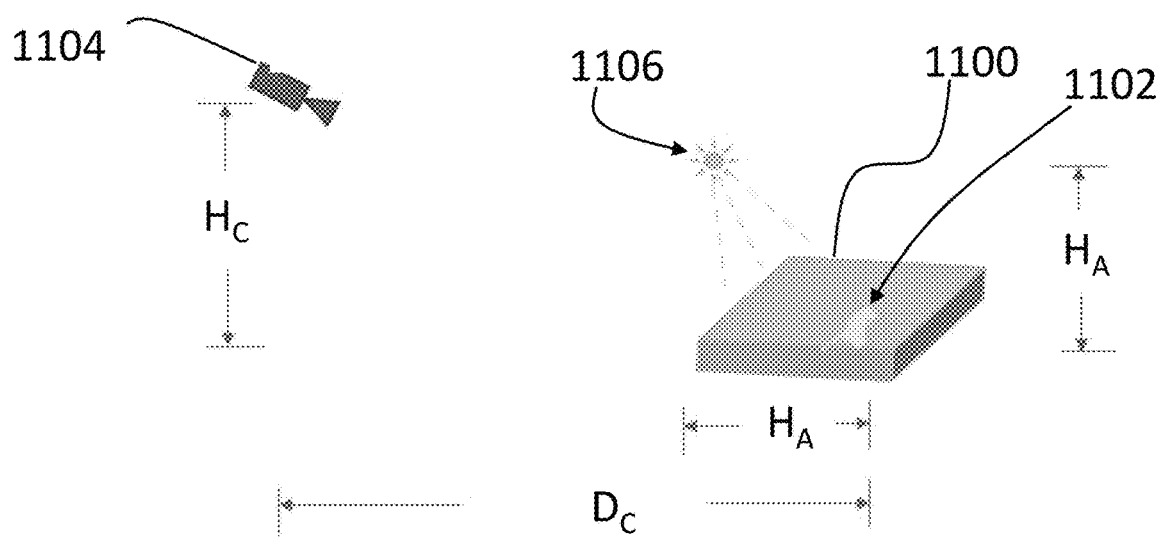
FIGS. 11A and 11B schematically illustrate a configuration for data collection on a specimen with damages and a plurality of spatial arrangements of the configuration for data collection, respectively.
Figure 11B:
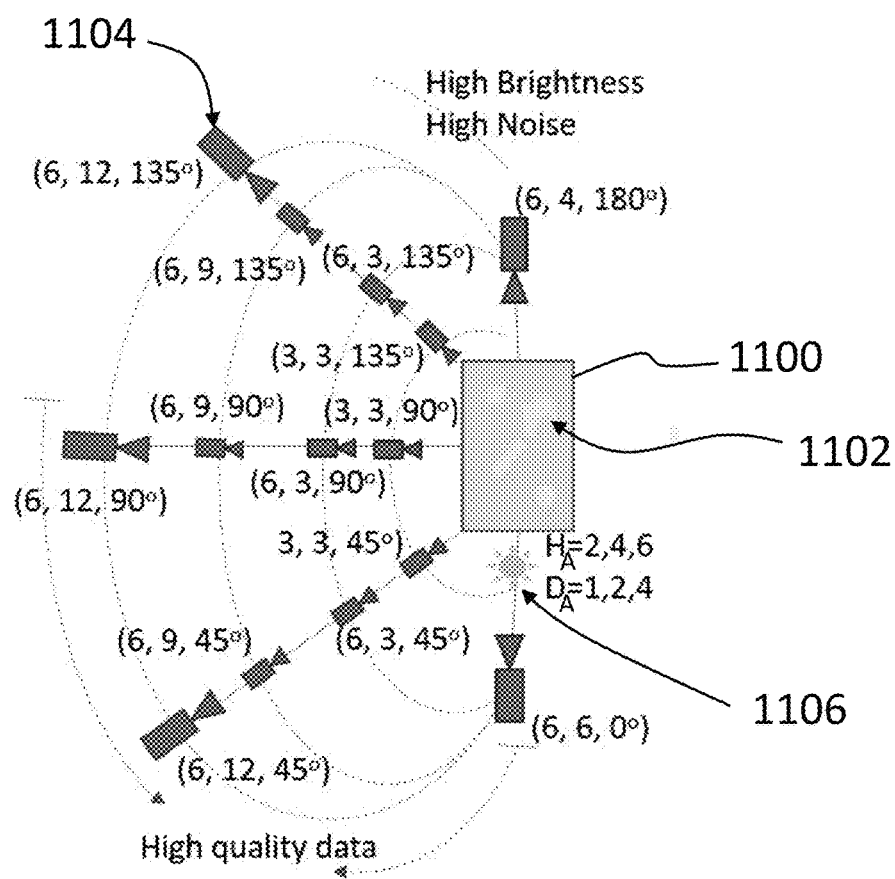

Active thermography techniques were used to collect data. FIG. 11A illustrates in three-dimensional (3D) or perspective view a configuration for data collection performed on specimen 1100, in the form of a concrete slab, with damage 1102. The halogen lamps were used in the laboratory to compare the quality of the data collection procedures, as shown in FIG. 11B. As schematically represented in FIG. 11B, the handheld and UAV cameras 1104 with heating activation sources 1106 were placed at different locations and with different orientations to determine the most favorable data collection condition (indicated in parentheses beside each schematic representation of either the camera or activation source and presented in the following order: height, distance and angle of orientation, where height and distance are given in feet). In FIG. 11A, $H_C$ and $D_C$ respectively denote the height and distance of the camera 1104 from the specimen 1100, and $H_A$ and $D_A$ respectively denote the height and distance of the activation source 1106 from the specimen. Through the experiment, it was observed that high-quality data could be obtained when both the camera and heating activation source are on the same side. However, high noise, brightness, and poor-quality data were elicited when the cameras were placed at the opposite side of the activation source.

To the best of the Applicant's knowledge, no public dataset is available for internal damage detection in concrete using thermography. Therefore, the data obtained from the thermal cameras in Section 3.1 were used for preparing ground truth. The video data were converted into images, and then the images were labeled using the commercially available Affinity photo-editing software [60]. The size of the images obtained from both handheld thermal cameras is 640×480×3, while the size of the image collected from the UAV camera is 640×512×3. All images were resized to 640×480×3. The total number of the initially collected images is 750, comprising 500 damaged images and 250 intact images, as presented in Table 1.

The 500 damaged images from Table 1 were labeled carefully at the pixel level, with 1 for damaged pixels and 0 for intact pixels. Conventional data augmentation techniques were implemented in the 500 damaged images, after which they were increased to 1,510 images as tabulated in Table 2. The augmentation techniques include blurring effect with different kernel sizes and rotating and flipping the images.

The 250 intact images from Table 1 with 1,510 augmented damaged images from Table 2, resulting 1760 images were used to train the proposed AGAN. The well-trained AGAN generated 320 newly generated images, as shown in Table 3.

These newly generated 320 images from Table 3 were added to the 500 damaged images from Table 1, resulting in 820 images for the training of the proposed IDSNet as shown in Table 4. Moreover, the existing RGB-Depth-Thermal images was used for pretraining to improve the accuracy of the segmentation. A total of 1,754 thermal images were selected from the datasets for pretraining the IDSNet.

Two deep learning networks are proposed in this disclosure: AGAN for data generation and IDSNet for internal damage segmentation. The AGAN was trained using the collected and developed dataset shown in Table 3, and then the trained AGAN was used to generate some additional images for the training of the IDSNet. Both AGAN and IDSNet were coded in Python programming language using PyTorch, an open-source, deep-learning library. The specifications of the workstation are as follows:

Ubuntu 18.04.4 LTS operating system, CPU: Intel® Core™ i7-6850K CPU @3.60 GHz, 1 physical processor, 6 cores 12 threads, RAM: 98.806 GB, and NVIDIA TITAN Xp GPU To train AGAN, a batch size of 8 and a learning rate of 0.0001 were used. As proposed in the improved WGAN in Section 2.1, the discriminator was trained five times more than the generator (i.e., for each generator update, five discriminator updates were run). In the initial stage of training, the authors visually evaluated the quality of the generated images and made selections accordingly. These generated images were used in the dataset to increase the latter's diversity. Therefore, the generated image quality is evaluated using specific standardized metrics. Based on the literature, Fréchet inception distance (FID) has been used in many recent studies to measure the quality of generated images. Therefore, the generated thermal images with damages from AGAN were visually analyzed and evaluated by FID [62] to measure the quality of the images.

Heusel et al. [62] showed that FID has significant similarities to human visual assessment. The FID metric is a more comprehensive and widely used guideline for the assessment of generated images. The FID is the Fréchet distance between two multidimensional Gaussian distributions. In addition, the FID estimates the distance between the synthetic generated data distribution and the real data distribution, which is used to measure the overall realness and diversity of the generated images. FID is expressed in Equation (21) below.

$$FID(P_r + P_s) = \|m_r - m_s\|^2 + Tr\left(\text{cov}_r + \text{cov}_s - 2\left(\sqrt[2]{(\text{cov}_r)(\text{cov}_s)}\right)\right), \quad (21)$$

where $m_r$ represents the feature-wise mean of the real images, $m_s$ represents the feature-wise mean of the synthetic generated images, $\text{cov}_r$ represents the covariance of the real feature images, and $\text{cov}_s$ represents the covariance of synthetic feature images.

Figure 12A:
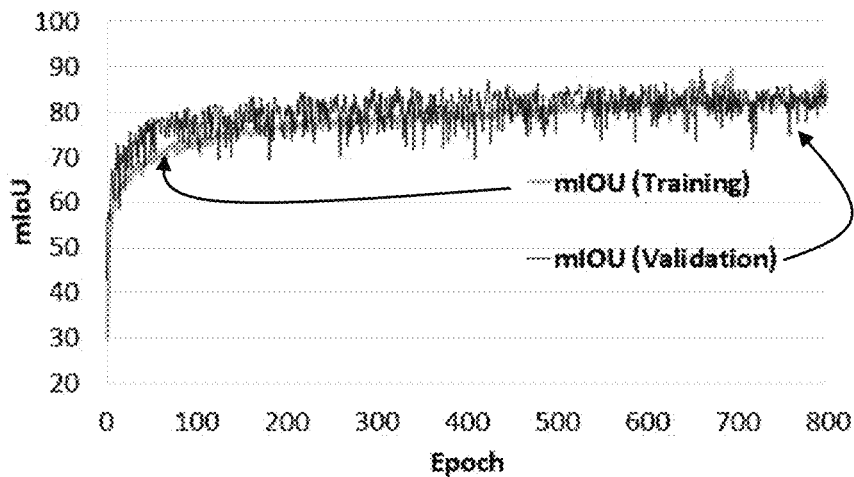
FIGS. 12A and 12B are graphs showing training and validation results, specifically (i) 'mean intersection over union' over the training epochs and (ii) loss over the epochs, respectively.
Figure 12B:
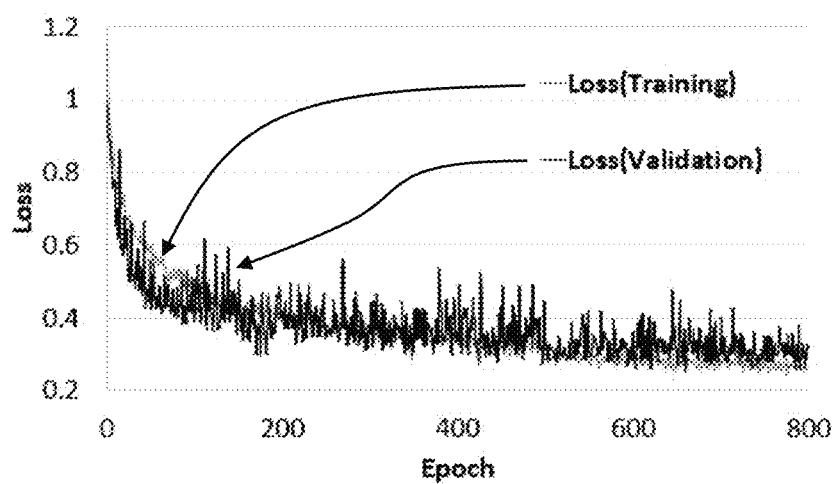

IDSNet was trained using the pretraining and training datasets listed in Table 4. The weight decay was 0.0005, and the learning rates for the first 400 epochs, 400 to 600 epochs, and 600 to 800 epochs were 0.001, 0.0005, and 0.00025, respectively. The Adam optimizer was employed for updating the learnable parameter to conduct backpropagation. As shown in FIG. 12A, the training and validation mIoUs are presented with a training and validation loss in FIG. 12B. The network achieved a maximum mIoU of 89.4 for the training set and a maximum mIoU for the validation set.

The two proposed networks are extensively investigated to evaluate the generation of acceptable synthetic images for the training of the IDSNet using AGAN and to evaluate the segmentation performances of the IDSNet with various arrays of the subfunctions and modules.

The FID was calculated to check the quality and diversity of the generated synthetic images. Two other methods, namely, the modified DCGAN [46] and the modified D2GAN [47], were used to generate synthetic thermal image samples for comparative studies. Table 5 shows a comparison of the number of images for all three models with the corresponding FID. To better compare the quality of the images developed by these networks, all the generated synthetic samples and original images were cropped into a size of 480×480×3. Compared with the modified DCGAN, the average percentage improvement of the final AGAN in terms of FID was 14.33%. The same number of original thermal images was compared with the synthetic images, and the FID scores are tabulated as shown in Table 5. Overall, the AGAN with attention and GAP module achieved the lowest FID (i.e., 124.33 for 50 images and 73.88 for 275 images), which is the best performance. The modified D2GAN achieved a higher FID score than the modified DCGAN (i.e., 172.19 for 50 images and 117.81 for 275 images). The AGAN with attention module has a lesser FID (i.e., 125.42 for 50 images and 74.09 for 275 images) than the AGAN without an attention module (i.e., 132.42 for 50 images and 93.85 for 275 images).

Figure 13:
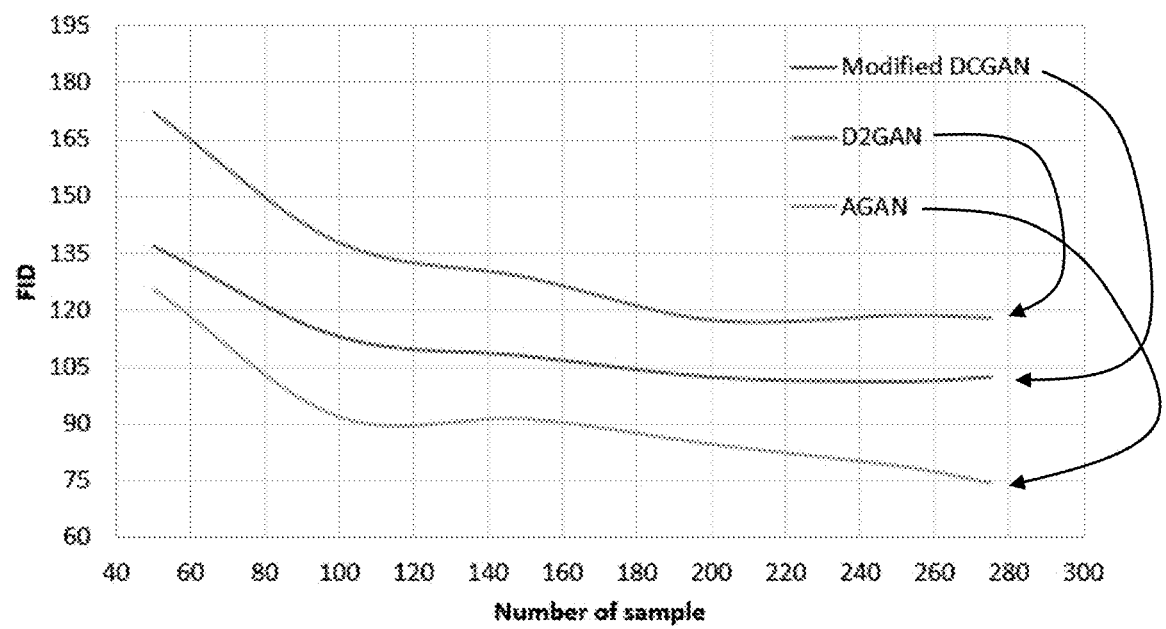
FIG. 13 is a graph showing Fréchet inception distance versus number of samples.

FIG. 13 shows the overall FID values for the generated samples. The FID values of the developed model AGAN are smaller than those of other state-of-the-art networks, which means that the model's synthetic damaged images have high diversity and better quality.

Figure 14A:
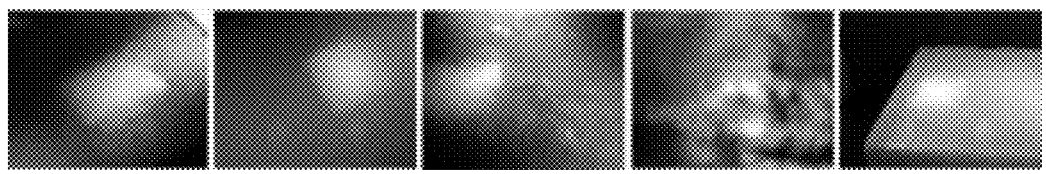
FIGS. 14A through 14D show original thermal images and synthetic images generated using D2GAN, DCGAN and AGAN, respectively.
Figure 14B:
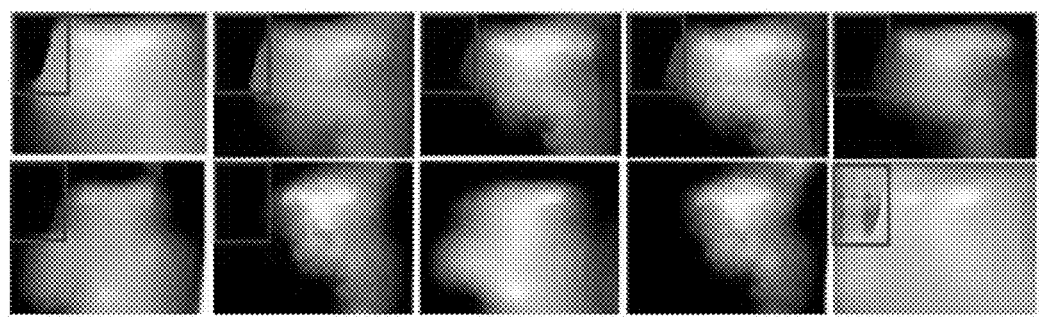
Figure 14C:
Figure 14D:
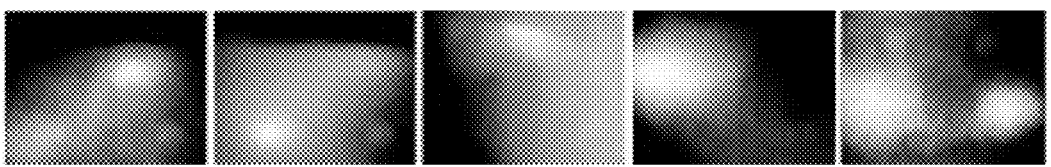

The generated samples of the modified D2GAN, modified DCGAN, and AGAN are presented in FIGS. 14A through 14D. The original thermal images with internal damages are presented in FIG. 14A. The synthetic thermal images with damages generated by D2GAN are shown in FIG. 14B. The FID score for D2GAN is also higher than that of the modified DCGAN and AGAN. Even though the images generated by D2GAN look fine compared to those from DCGAN, in other words they appear similar, the images generated by D2GAN have less diversity due to mode collapse. It is a phenomenon that GAN generates only specific limited patterns again and again, as highlighted by the bounding boxes in FIG. 14B. As a result, there is less diversity compared to the other models. The images generated by DCGAN manifest many differences from the original real thermal images with damages and without damages. Diversity and quality act to improve training of the network. The results of the network AGAN exhibit high quality and diversity. Moreover, as shown in FIG. 14D, the generated synthetic images by AGAN are mostly identical.

Another metric used to evaluate the performance of a GAN is the Learned Perceptual Image Patch Similarity (LPIPS) metric, which measures the perceptual similarity between real and generated images [66]. The authors in [66] have also reported that LPIPS evaluates the closeness rate between images, at a level similar to human judgement. LPIPS has additionally been used for measuring the perceptual distance of thermal images, and it has been shown that lower LPIPS values represent better quality of generated images [67]. Another study [68] of thermal image generation has similarly shown that lower LPIPS values for generated thermal images represents higher quality and more realistic image features. For a generated image i' and real image i, having height H and width W, LPIPS is given by:

$$LPIPS(i', i) = \sum_{l}^{L} \frac{1}{H W} \sum_{h_l w_l} [f_l(i') - f_l(i)]^2 \times w_l \quad (22)$$

where $f_l(i')$, $f_l(i)$ are the normalized feature weights of layer l obtained from a pretrained CNN architecture by giving i and i' as input. The learned weight matrix of the layer l is $w_l$. The LPIPS values were calculated for 120 images of DCGAN, D2GAN, and AGAN results against the 120 original images data. The LPIPS metric for AGAN was smaller than both DCGAN and D2GAN, as presented in the following Table 6. The value for D2GAN was worse than that of DCGAN, which is the same trend compared to that of FID.

To evaluate the performance of the IDSNet, the network was tested on new testing images that were not used for any training process, as presented in Table 4. Four evaluation matrices, namely, mIoU, positive predictive value (PPV), sensitivity, and F1-score, which are expressed in Equations (23)-(26), are calculated on the test sets. The results of the network performance are presented in Table 7. The IDSNet achieved a mIoU, mean PPV, F1-score, and sensitivity of 0.90, 0.937, 0.935, and 0.948, respectively. The network performs the processes in real-time with over 74 FPS for a 640×480×3 image when tested on the workstation. In addition, the current available thermal cameras have 30 FPS and 60 FPS, which can be easily input into the network to detect internal damages in real-time.

$$mIoU = \text{mean}\left(\frac{\text{true positive}}{\text{true positive} + \text{false positive} + \text{false negative}}\right) \quad (23)$$

$$PPV = \frac{\text{true positive}}{\text{true positive} + \text{false positive}} \quad (24)$$

$$\text{Sensitivity} = \frac{\text{true positive}}{\text{true positive} + \text{false negative}} \quad (25)$$

$$F1 - \text{score} = \frac{2 \times \text{Precision} \times \text{Recall}}{\text{Precision} + \text{Recall}} \quad (26)$$

Figure 15:
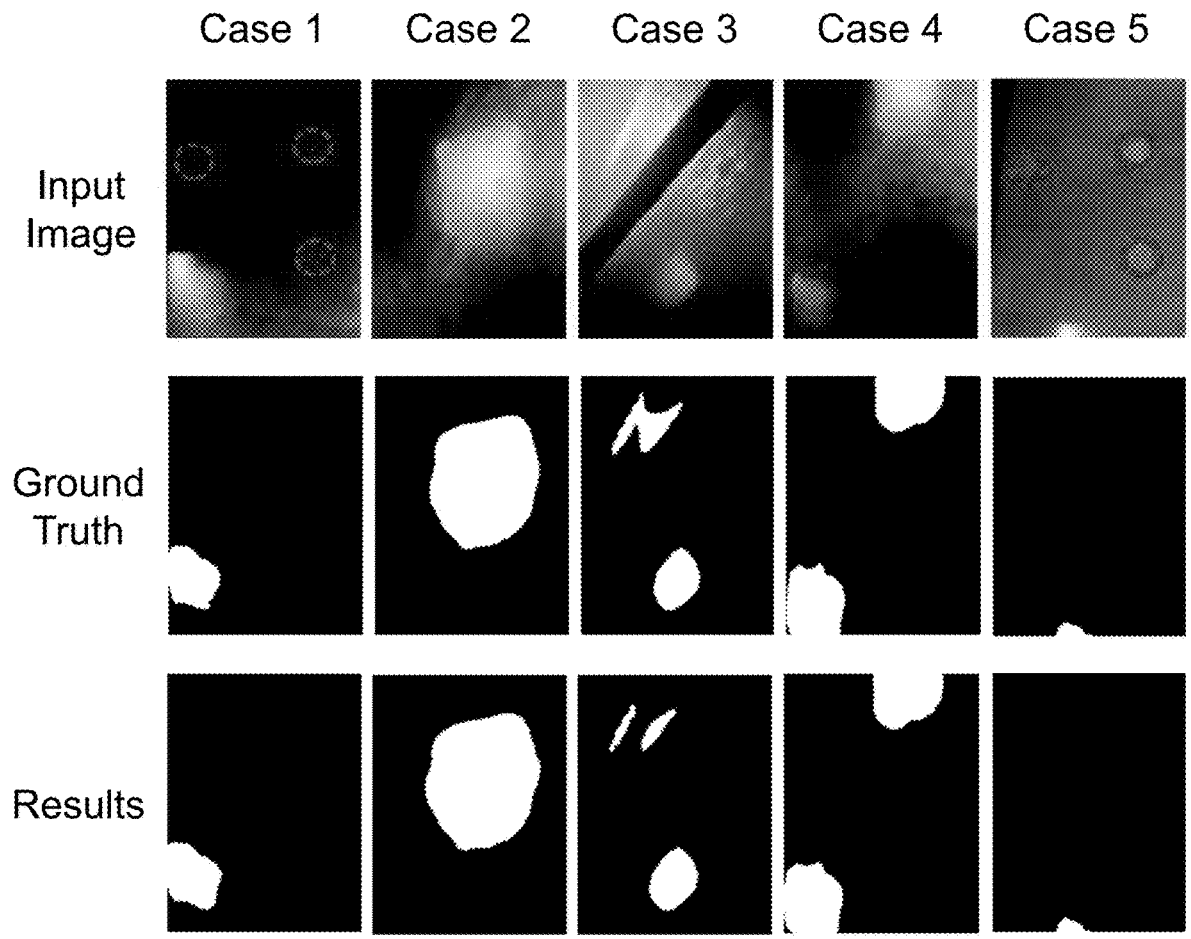
FIG. 15 shows IDSNet performance examples.

FIG. 15 shows the segmentation results and ground truth of IDSNet. The model successfully segments the internal damage portion in concrete within the thermal images. The ground truths of the samples were generated through the Affinity photo-editing software using prior knowledge during slab preparation. In addition, the results were validated using UPV. FIG. 15 shows five different cases with different sizes and depths of internal damages in the slabs. The dashed circles in Case 1 indicate the noise in the thermal image obtained by the handheld thermal camera. The network successfully neglects the noise and detects the internal damages. Case 2 shows a single large damage in the middle of the concrete slab. Case 3 contains two slabs with a gap between them, a very bright light noise at the edges, and some background. The network successfully neglects the gap and the background. However, some portion of the internal damage is missing due to bright light noise. In Case 4, the network successfully detects two internal damages with a partial shadow on top of the slabs. A very small internal damage is also detected in Case 5, and the noises are successfully neglected, as depicted in the dashed circles.

Figure 16:
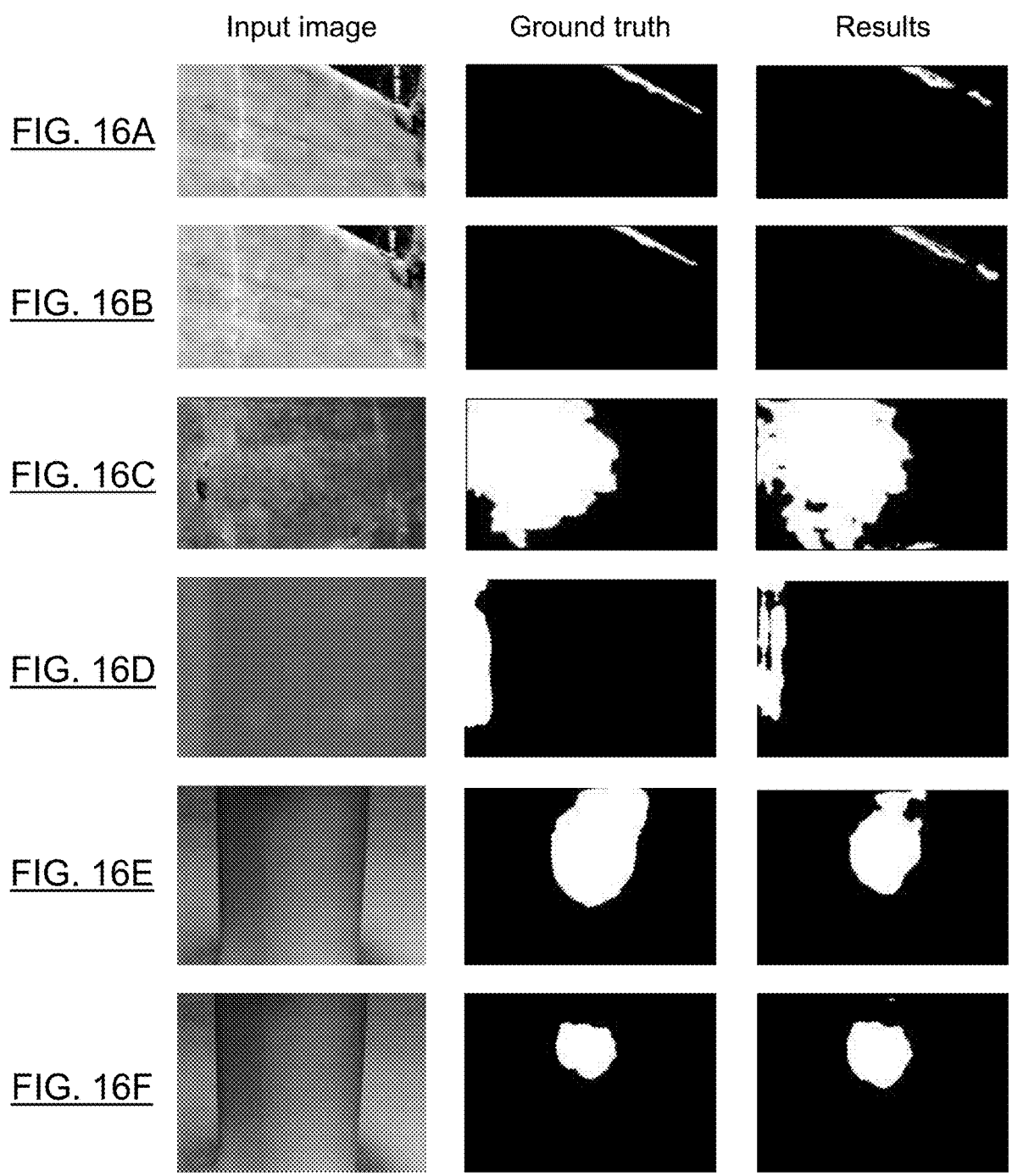
FIGS. 16A through 16F show internal damage detection within thermal images of bridge and parking structures.

FIGS. 16A through 16F show the results obtained from a bridge in Winnipeg, Canada. The data were collected from the wing walls, abutments, piers, and bridge deck slabs. FIG. 16A shows a thermal image of the top of a bridge abutment wing wall with a smaller internal damage. The damaged areas were investigated through traditional-sounding methods and were confirmed as damaged zones. The image was taken from the bottom of the wing wall at a vertical angle. It was found that the damaged zones were exposed to the ingress of rainwater, which caused the internal damage. The ground truths of the damaged zone was prepared, and the IDSNet segmented results are shown in the right column. A small portion of the damaged zone was missed during segmentation. In FIG. 16B, additional internal damaged areas were detected when another input image was fed to the network of the same location. The network successfully negates the background and the metal sections that were used for protection. FIGS. 16A and 16B also include the metal protection, as depicted by the dashed circle and the sky background, which have no negative impact on the network's overall robustness.

Similarly, in FIG. 16C, another large internal damage area was segmented using IDSNet. The ground truth of the damaged section was carefully studied using two methods, specifically ASTM D 4580 [7] and ASTM C 597 [59], to check the robustness of the network. To test the performance of the developed method, additional experiments were conducted in two large parking structures, the University of Manitoba (UofM) parkade and The Bay parkade, located in Winnipeg, Canada. The Bay parkade was built in 1954 and was the only multi-level parking structure at that time between Vancouver and Thunder Bay in Canada [58].

Experiments were conducted both in the University of Manitoba (UofM) parkade and The Bay parkade. No internal damages were observed in the UofM parkade, using both ASTM D 458 and ASTM C-597, and thermography procedures. In case of The Bay parkade, several internal damages were observed. During the experiments, the second floor of the parkade was under repair and was closed to the public. The authors collected the data from the damaged and repaired column sections (i.e., FIGS. 16D, 16E and 16F), and the ground truth results were prepared using ASTM C-597 (ultrasonic pulse velocity test). The input images, ground truths, and results are presented in FIGS. 16A-16F. FIG. 16D shows a vertical internal damage on the side of the column. The IDSNet detected a portion of the damage, however, some portions were missed. Similarly, the damages in FIGS. 16E and 16F are also detected but with slight differences in the boundary of the ground truths.

The proposed IDSNet was extensively investigated to evaluate the effects of its submodules and the proposed AGAN. Table 8 shows five different metrics to compare the network results. At first, when the network was trained without AGAN data, it achieved a maximum PPV of 0.865, F1-score of 0.828, sensitivity of 0.844, and mIoU of 0.785. The IDSNet was also trained without the superficial module, and the network achieved a maximum PPV of 0.918 and mIoU of 0.771. The number of parameters for the IDSNet without a superficial module was 0.071 million (i.e., 0.014 million lesser than that of the final IDSNet). The IDSNet trained with the generated data from the modified DCGAN and modified D2GAN achieved an mIoU of 0.846 and 0.821, respectively. The model was also trained without pretrained data and achieved a PPV of 0.937 and an mIoU of 0.891. The final IDSNet, which uses the pretrained data, AGAN data, and superficial module, achieved a maximum mIoU of 0.90, PPV of 0.952, F1-score of 0.942, and sensitivity of 0.942, with 0.085 million total parameters.

Some existing state-of-the-art networks' performances were compared with those of IDSNet. For example, UNet++ [63], Attention UNet [64], and DeeplabV3+ [65] were implemented. The experimental results of the extensive comparative studies are presented in Table 9. UNet++, Attention UNet, and DeeplabV3+ achieved a mIoU of 0.822, 0.866, and 0.814, respectively, whereas IDSNet achieved a mIoU of 0.90, which is 3.4% higher than that of the Attention UNet. The Attention UNet achieved a sensitivity of 0.928 (i.e., 2% less than that of IDSNet), F1-score of 0.907 (i.e., 4% less than that of IDSNet), mIoU of 0.876 (i.e., 2.3% lesser than that of IDSNet), and PPV of (i.e., 5% lesser than that of IDSNet). The IDSNet can process 640×480×3 input images with 74 FPS and only has 0.085 million parameters. Overall, the proposed IDSNet outperforms other networks in terms of segmentation performance and processing time.

Figure 17:
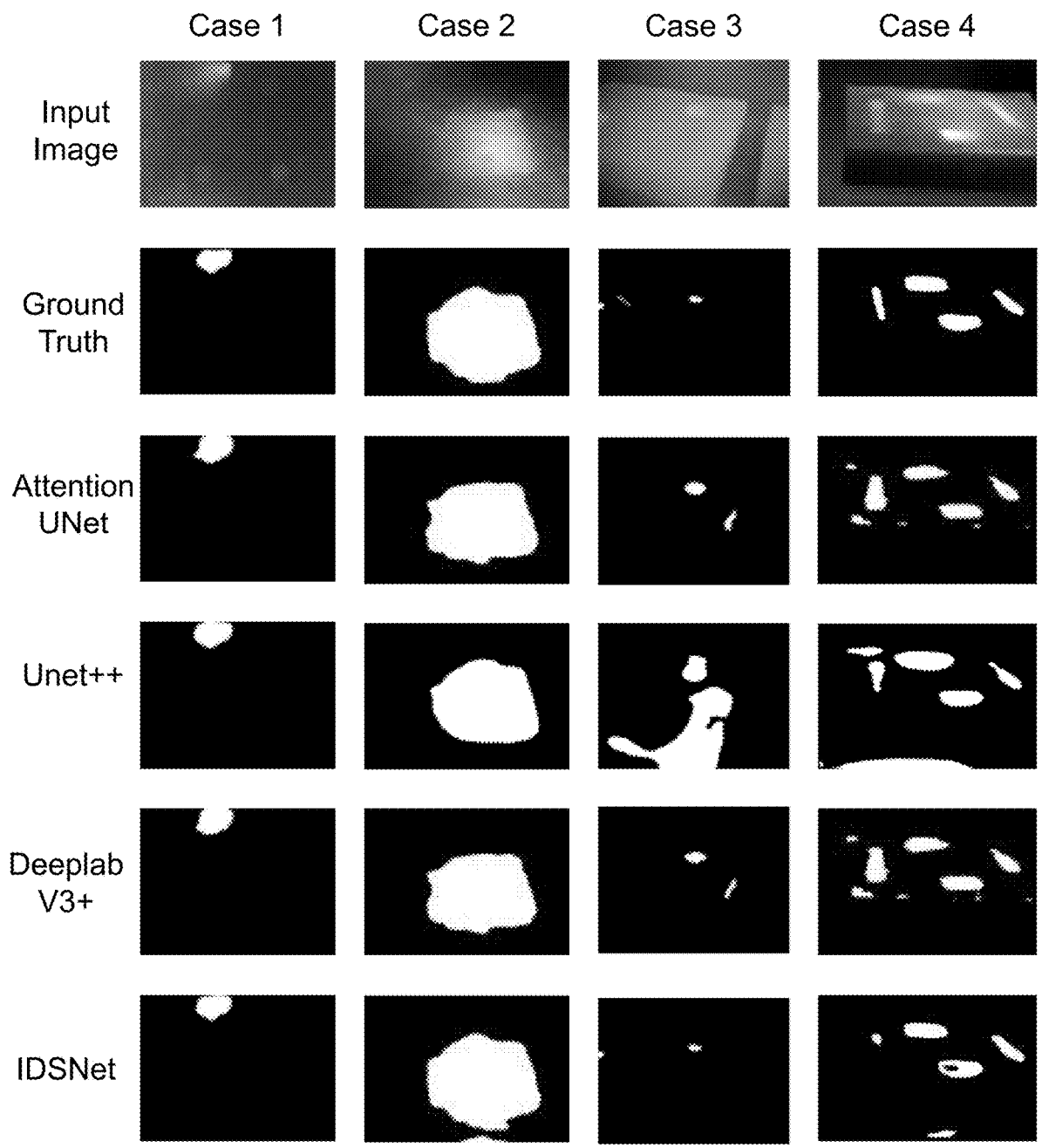
FIG. 17 shows sample results of comparative studies of different segmentation algorithms including the arrangement of the present invention.

FIG. 17 shows four different cases of thermal input images with internal damages in concrete. The ground truth and the results of Attention UNet, UNet++, DeeplabV3+, and IDSNet are presented below. Cases 1 and 2 contain single internal damages. The damages in Cases 1 and 2 are detected by all the models with a slight difference. Case 3 contains two slabs with a gap and a background, as well as three small internal damages, as shown in the ground truth. In Case 3, UNet++ detected one damage, but it identified an intact portion of the image as an internal damage. Attention UNet and DeeplabV3 detected a single damage and missed two damages. Similarly, IDSNet detected two damages and missed one damage in Case 3. In Case 3, the small damage in the center with a thickness equal to 0.0004 m was not detected. However, other damages in the same specimens were detected because of their relatively larger geometrical shapes and thicknesses. In Case 4, the slabs contain four internal damages with a background, which were all detected by the four models. Attention UNet++ and DeeplabV3 detected the damages, but they identified the surrounding portions as damages. IDSNet accurately detected two damages with a partial missing part of the other two damages in Case 4.

The authors observed that the depth of the damages from the surface, the thickness of the damages, the geometry of the damages, and the type of the polystyrene material, all affected the overall thermal data and damage segmentation performance. The authors found that damages of size 0.090 m×0.090 m were easily detected when the depth was 0.045 m or less from the surface of the slabs. However, the same size damages were not detectable when the depth of the damages was greater than 0.045 m. Similarly, damages with size 0.150 m×0.150 m were detected when the depth from the surface was 0.070 m or less.

Figure 18A:
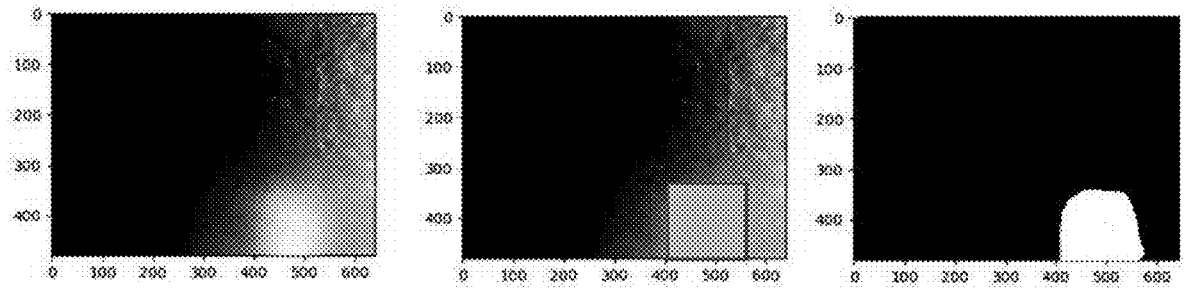
FIGS. 18A through 18D show damage segmentation with different geometrical shapes.
Figure 18B:
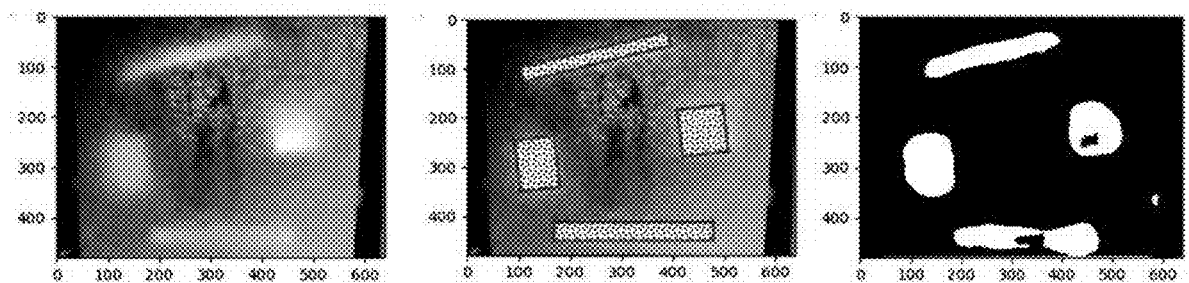
Figure 18C:
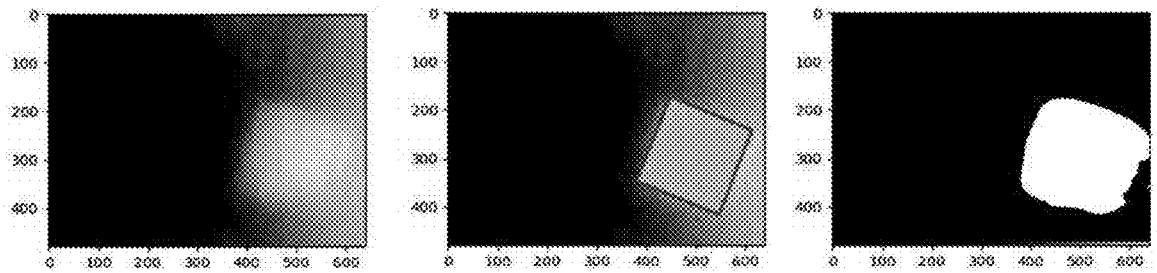
Figure 18D:
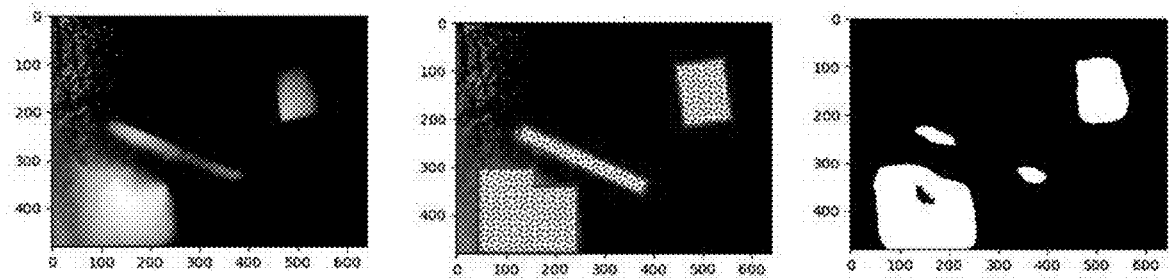

The type of polystyrene also affected the damage segmentation performance of IDSNet. Solid polystyrene was easily detected as shown in FIGS. 18A and 18C, and only slight differences were observed between the actual geometry and the segmented damaged area. In FIG. 18B, porous polystyrene at different depths from the surface was used to replicate honeycombing conditions. The shallow depth damages were accurately detected, compared to the deeper damages. In FIG. 18D, two damages of larger sizes were successfully detected, but the central portion of the long damage shape was not well segmented. It was concluded that increased depth from the surface, smaller geometry, smaller thickness, and porous polystyrene increased the complexity of internal damage detection.

To detect and segment the internal damage (i.e., delamination, debonding, cracks, voids, and honeycombing) of concrete structures, an advanced deep learning-based pixel-level damage segmentation method was developed using thermography. The developed IDSNet requires a large amount of data to train it due to the nature of deep learning networks. However, the collection of ground truth data for internal damage is quite challenging and time consuming. To overcome these serious limitations and difficulties, AGAN, an attention-based GAN, was developed to generate synthetic data to train IDSNet. Therefore, there is disclosed AGAN to generate synthetic images and IDSNet for internal damage segmentation in concrete.

It will be appreciated that:
1) This disclosure addresses the scarcity of thermal image data for internal damage segmentation in concrete members.
2) A total of 20 concrete slab surfaces with internal damages were cast in the laboratory, in which 16 slab surfaces were used for training and four slab surfaces for testing the network.
3) In this disclosure, different depths of damages from the slab surface, various geometrical shapes of damages, several thicknesses of damages, and porous and solid polystyrene were used to replicate actual internal damage conditions such as delamination, debonding, voids and honeycombing.
4) The handheld and UAV cameras with heating activation sources were placed at different locations and with different orientations to determine the most favorable data collection condition. It was concluded that high-quality data could be obtained when both the camera and the heating activation source are on the same side. However, high noise, brightness, and poor-quality data were elicited when the cameras were placed at the opposite side of the activation source.
5) An attention-based GAN was developed to generate synthetic image data to diversify the dataset. The AGAN was compared with the modified DCGAN and modified D2GAN using FID metrics.
6) FID scores were adopted to evaluate the generated synthetic data from AGAN, and they were compared with those of traditional GANs (i.e., modified DCGAN and modified D2GAN). The quality and diversity of the synthetic images generated by the proposed AGAN outperformed those of the traditional GAN. The average percentage improvement of the final AGAN in terms of FID was 14.33% compared with the modified DCGAN.
7) The LPIPS metric was also used to measure the similarity between real and generated images. The AGAN score was 0.343, which is less than both modified DCGAN (0.428) and modified D2GAN (0.484).
8) The IDSNet achieved state-of-the-art performance, with a mIoU of 0.900, PPV of 0.952, F1-score of 0.941, and sensitivity of 0.942, compared with recent advanced networks (i.e., UNet++, DeeplabV3+, Attention UNet).
9) IDSNet can go beyond the real-time processing of 640×480×3 size of thermal images with 74 FPS with GPU due to its extremely light-weight segmentation network with only 0.085 M learnable parameters. All the other networks were not able to perform real-time processing with large learnable parameters (i.e., Attention UNet 34.8 M).
10) IDSNet without AGAN data achieved a mIoU of 0.785, PPV of 0.865, F1-score of 0.828, and sensitivity of 0.844. Compared with the IDSNet with AGAN data, the IDSNet without AGAN data achieved 12% lesser mIoU, 9% lesser PPV, 12% lesser F1-score, and 10% lesser sensitivity. The IDSNet trained with the generated data from DCGAN and D2GAN achieved an mIoU of 0.846 and 0.821 respectively, which is lower than with that of AGAN.
11) The IDSNet without SM achieved an mIoU of 0.771, PPV of 0.918, F1-score of and sensitivity of 0.825. Compared with the IDSNet with a superficial module, the IDSNet without a superficial module achieved 13% lesser mIoU, 4% lesser PPV, 11% lesser F1-score, and 12% lesser sensitivity. The total number of parameters of the IDSNet without a superficial module was 0.071 million, which is million lesser than that of the final IDSNet.

12) The damages with dimensions of 0.090 m×0.090 m were easily detected when the depth of the damages was 0.045 m or less from the surface of the slabs. The larger size damages with dimensions of 0.150 m×0.150 m were detected when the depth of damages was 0.070 m from the surface. In addition, the smaller thickness damages such as 0.0004 m were not detectable when their dimensions were small.

13) The IDSNet missed some portion of the damages when porous polystyrene was used.

14) The developed method was tested and validated for two large scale structures, a parking structure and a bridge structure, to check the performance of the method. The method showed good agreement with the standard methods from ASTM.

It will be appreciated that a hybrid imaging approach may be used for damage detection.

The method described hereinbefore, when configured to detect defects in concrete, is suited for use on exposed concrete which is dry. In other words, the method may not be suited in rainy or snowy conditions, and may not be performed when concrete is wet or covered with snow. Additionally, the method is not suited if the surface of the concrete is covered with drywall, glass, or tiles.

As described hereinbefore, the present invention relates to a real-time, high-performance deep-learning network particularly suited for segmenting internal damages of concrete members at the pixel level using active thermography. Unlike surface damage, the collection and preparation of ground truth data for internal damage is extremely challenging and time consuming. To overcome these critical limitations, an attention-based generative adversarial network (AGAN) is provided to generate synthetic images for training the proposed internal damage segmentation network (IDSNet). The developed IDSNet outperforms other state-of-the-art networks, with a mean intersection over union of 0.900, positive predictive value of 0.952, F1-score of and sensitivity of 0.942 over a test set. AGAN improves 12% of the mIoU of the IDSNet. IDSNet can perform real-time processing of 640×480×3 sizes of thermal images with 74 frames per second due to its extremely lightweight segmentation network with only 0.085 M total learnable parameters.

As described hereinbefore, there is disclosed a computer-implemented method for analyzing an image to detect an article of interest, comprising:
  receiving the image, wherein the image is thermographic;
  processing the image using a machine learning algorithm configured to detect the article of interest, wherein the machine learning algorithm comprises a convolutional neural network;
  and displaying the image with location of the article of interest being indicated if determined to be present by the convolutional neural network;
  wherein the convolutional neural network comprises:
    a first convolution module configured to receive the image and to extract features of the thermographic image to form a feature map, wherein the first convolution module comprises at least one convolution layer, wherein each convolution layer comprises a convolution operator, batch normalization and a nonlinear activation function;
    a second convolution module after the first convolution module and configured to reduce size of the feature map, wherein the second convolution module comprises at least one convolution layer, wherein each convolution layer of the second convolution module comprises a convolution operator, batch normalization and a nonlinear activation function;
    an average pooling module after the first convolution module and configured to receive an output of the first convolution module, wherein the average pooling module comprises at least one series of iterations of average pooling operators;
    an in-depth module after the second convolution module and the average pooling module and configured to learn correlations and contextual features of the image, wherein the in-depth module receives, as input, an output of the second convolution module concatenated with an output of the average pooling module;
    a final pointwise convolution layer after the in-depth module and configured to receive an output thereof;
    a preliminary upsampling module after the final convolution layer and configured to receive an output thereof, wherein the preliminary upsampling module comprises one or more iterations of an upsampling operator;
    a superficial module after the first convolution module and configured to receive the feature map thereof, wherein the superficial module comprises parallel depth-wise asymmetric convolution layers configured to extract features relevant to the article of interest; and
    a secondary upsampling module after the superficial module and the preliminary upsampling module and configured to receive outputs thereof, wherein the secondary upsampling module comprises one or more iterations of an upsampling operator.

It will be appreciated that in the disclosure, the in-depth module may be referred to as the intensive module.

In the illustrated arrangement, the at least one convolution layer of the first convolution module comprises a plurality of convolution layers, and consecutive initial ones of the convolution layers at a beginning of the first convolution module have common filter sizes and a final one of the convolution layers has a different filter size than the consecutive initial convolution layers.

In the illustrated arrangement, the at least one convolution layer of the second convolution module comprises a single convolution layer with a smaller filter size than the at least one convolution layer of the first convolution module.

In the illustrated arrangement, the in-depth module comprises an in-depth convolution submodule including depth-wise asymmetric convolution layers and depth-wise dilated separable convolution layers, plural series of iterations of residual in-depth convolution submodules and one or more concatenation modules respectively configured to concatenate outputs of submodules of the in-depth module upstream thereof, wherein each of the residual in-depth convolution submodules comprises depth-wise asymmetric convolution layers and depth-wise separable dilated convolution layers, wherein an output of each residual in-depth convolution submodule includes an input thereto, wherein each subsequent one of the iterations in a respective one of the series of residual in-depth convolution submodules has a different dilation rate.

It will be appreciated that in the disclosure, the in-depth convolution submodule and the residual in-depth convolution submodule may be referred to as the intensive convolution module and the residual intensive convolution module, respectively.

In the illustrated arrangement, the plural series of iterations of residual in-depth convolution submodules comprises first and second series thereof, wherein the first series of iterations of residual in-depth convolution submodules is after the in-depth convolution submodule and the second series of iterations of residual in-depth convolution submodules is after the first series thereof and has different filter sizes than the residual in-depth convolution submodules of the first series.

In the illustrated arrangement, the plural series of iterations of residual in-depth convolution submodules comprises first and second series thereof, wherein the first series of iterations of residual in-depth convolution submodules is after the in-depth convolution submodule and the second series of iterations of residual in-depth convolution submodules is after the first series thereof and has different filter sizes than the residual in-depth convolution submodules of the first series.

In the illustrated arrangement, when the at least one series of iterations of average pooling operators of the average pooling module comprises first and second series thereof having different filter sizes and said first series, with larger filter size than said second series, forms the output of the average pooling module that is concatenated with the output of the second convolution module to form the input of the in-depth module, the one or more concatenation modules comprises a first concatenation module between the first and second series of iterations of residual in-depth convolution submodules such that an output of the first concatenation module is an input to the second series of iterations of residual in-depth convolution submodules, wherein the first concatenation module is configured to receive, as input, an output of the in-depth convolution submodule, an output of the first series of iterations of residual in-depth convolution submodules and the second series of average pooling operators of the average pooling module.

In the illustrated arrangement, when the second series of iterations of residual in-depth convolution submodules comprises first and second iterations thereof, the one or more concatenation modules of the in-depth module comprises a second concatenation module after the second series of iterations of residual in-depth convolution submodules and configured to receive, as input, respective outputs of the first and second iterations of the second series of iterations of residual in-depth convolution submodules.

In the illustrated arrangement, the in-depth convolution submodule is a first module of the in-depth module.

In the illustrated arrangement, the in-depth convolution submodule comprises plural iterations of a sub-submodule including one of the depth-wise asymmetric convolution layers and one of the depth-wise separable dilated convolution layers after said depth-wise asymmetric convolution layer and including a depth-wise dilated convolution and a pointwise convolution thereafter, wherein a dilation rate of each subsequent one of the iterations is different.

In the illustrated arrangement, the in-depth convolution submodule comprises plural parallel operations each comprising the plural iterations of the sub-submodule, wherein the dilation rates of the depth-wise asymmetric and separable dilated convolution layers of the parallel operations are different, and wherein, in at least one of the plural parallel operations, the dilation rate of each subsequent iteration of the sub-submodule is the same.

In the illustrated arrangement, an output of the in-depth convolution submodule is a concatenation of outputs of the parallel operations.

In the illustrated arrangement, the in-depth convolution submodule includes a convolution layer before the plural iterations of the sub-submodule.

In the illustrated arrangement, each of the residual in-depth convolution submodules comprises plural parallel operations, one of which includes a convolutional layer and another two of which include one of the depth-wise asymmetric convolution layers and one of the depth-wise separable dilated convolution layers after said depth-wise asymmetric convolution layer and including a depth-wise dilated convolution and a pointwise convolution thereafter, wherein dilation rates of said another two of the parallel operations are different.

In the illustrated arrangement, an output of each residual in-depth convolution submodule is a concatenation of outputs of the parallel operations thereof.

In the illustrated arrangement, each residual in-depth convolution submodule includes a pointwise convolution before the parallel operations.

In the illustrated arrangement, the superficial module further includes convolution layers respectively after the parallel depth-wise asymmetric convolution layers.

In the illustrated arrangement, outputs of the convolution layers after the parallel depth-wise asymmetric convolution layers are summed and a pointwise convolution is applied thereto.

In the illustrated arrangement, an output of the pointwise convolution is summed with an input of the superficial module to form an output of the superficial module.

In the illustrated arrangement, the superficial module includes a convolution layer before the depth-wise asymmetric convolution layers.

In the illustrated arrangement, the superficial module is consecutively iterated.

When the superficial module is consecutively iterated, parameters of the superficial module are the same for all iterations. In the illustrated arrangement, there are three consecutive iterations of the superficial module.

There is also disclosed a computer-implemented method for generating, based on authentic training data, synthetic training data for training an artificial neural network, the computer-implemented method comprising:
  performing a plurality of iterations of:
    using a first neural network, generating one or more pieces of the synthetic training data based on random input noise;
    wherein the first neural network comprises:
      a plurality of transpose convolution layers, wherein each convolution layer comprises a transpose convolution operator, batch normalization and a non-linear activation function, wherein an initial one of the convolution layers is configured to receive the random input noise; and
      at least one attention module intermediate respective ones of the convolution layers, wherein each of the at least one attention module is configured to determine dependencies of features extracted by earlier ones of the convolution layers preceding a respective one of the attention module;
    using a second neural network, receiving the generated synthetic training data and comparing to the authentic training data to determine a realness score representative of closeness of the synthetic and authentic training data, wherein the second neural network comprises:
- a plurality of convolution layers wherein each convolution layer comprises a convolution operator, batch normalization and a nonlinear activation function, wherein an initial one of said convolution layers is configured to receive an input comprising the generated synthetic training data and the authentic training data; and
- at least one attention module intermediate respective ones of the convolution layers of the second neural network, wherein each of the at least one attention module is configured to determine dependencies of features extracted by earlier ones of the convolution layers preceding the attention module;

wherein, in each of the iterations after a first iteration, the realness score determined by the second neural network is provided as input to the first neural network additional to the random input noise.

In the illustrated arrangement, the at least one attention module of the first neural network comprises a plurality of non-consecutive attention modules.

In the illustrated arrangement, the attention modules are separated by one of the convolution layers.

In the illustrated arrangement, the at least one attention module of the second neural network comprises a plurality of non-consecutive attention modules.

In the illustrated arrangement, the attention modules are separated by one of the convolution layers.

In the illustrated arrangement, the attention modules of the first and second neural networks are the same.

In the illustrated arrangement, the second neural network further comprises a global average pooling squeeze-and-expansion-based attention operator before the at least one attention module, wherein an output of the squeeze-and-excitation is provided as input to a later one of the convolution layers after the at least one attention module.

The scope of the claims should not be limited by the preferred embodiments set forth in the examples but should be given the broadest interpretation consistent with the specification as a whole.

REFERENCES

[1] Gucunski, N., & National Research Council. (2013). *Nondestructive testing to identify concrete bridge deck deterioration*. Transportation Research Board. http://dx.doi.org/10.17226/22771.

[2] Omar, T., & Nehdi, M. L. (2017). Clustering-based threshold model for condition assessment of concrete bridge decks using infrared thermography. In International Congress and Exhibition Sustainable Civil Infrastructures: Innovative Infrastructure Geotechnology (pp. 242-253). Springer, Cham. https://doi.org/10.1007/978-3-319-61914-9_19.

[3] Adams, T. M., & Pincheira, J. A. (2002). *Assessment and rehabilitation strategies/guidelines to maximize the service life of concrete structures*. Wisconsin Department of Transportation. http://digital.library.wisc.edu/1793/6891.

[4] Maser, K. R., & Roddis, W. K. (1990). Principles of thermography and radar for bridge deck assessment. *Journal of transportation engineering*, 116(5), (pp. 583-601). http://dx.doi.org/10.1061/(ASCE)0733-947X(1990)116:5(583).

[5] Cheng, C., Shang, Z., & Shen, Z. (2019). CNN-based deep architecture for reinforced concrete delamination segmentation through thermography. In *Computing in Civil Engineering 2019: Smart Cities, Sustainability, and Resilience* (pp. 50-57). Reston, VA: American Society of Civil Engineers. http://dx.doi.org/10.1061/9780784482445.007.

[6] Washer, G., Fenwick, R., Bolleni, N., & Harper, J. (2009). Effects of environmental variables on infrared imaging of subsurface features of concrete bridges. *Transportation research record*, 2108(1), (pp. 107-114). http://dx.doi.org/10.3141/2108-12.

[7] ASTM D4580/D4580M-12(2018), Standard Practice for Measuring Delaminations in Concrete Bridge Deck by Sounding, American Society for Testing and Materials, Book of Standards Volume: 04.03_https://doi.org/10.1520/D4580_D4580M-12R18.

[8] Scott, M., Rezaizadeh, A., Delahaza, A., Santos, C. G., Moore, M., Graybeal, B., & Washer, G. (2003). A comparison of nondestructive evaluation methods for bridge deck assessment. *ndt & E International*, 36(4), (pp. 245-255). http://dx.doi.org/10.1016/S0963-8695(02)00061-0.

[9] FHWA (Federal Highway Administration). (2004). National bridge inspection standards. *Federal Register*, 69(239), (pp. 74419-39). https://www.govinfo.gov/content/pkg/FR-2004-12-14/pdf/04-27355.pdf.

[10] Nair, A., & Cai, C. S. (2010). Acoustic emission monitoring of bridges: Review and case studies. *Engineering structures*, 32(6), (pp. 1704-1714). https://doi.org/10.1016/j.engstruct.2010.02.020.

[11] Abdelkhalek, S., & Zayed, T. (2020). Comprehensive Inspection System for Concrete Bridge Deck Application: Current Situation and Future Needs. *Journal of Performance of Constructed Facilities*, 34(5), (pp. 03120001). http://dx.doi.org/10.1061/(ASCE)CF.1943-5509.0001484.

[12] Lester, J., & Bernold, L. E. (2007). Innovative process to characterize buried utilities using ground penetrating radar. *Automation in construction*, 16(4), (pp. 546-555). http://dx.doi.org/10.1016/j.autcon.2006.09.004.

[13] Gucunski, N., Romero, F. A., Shokouhi, P., & Makresias, J. (2005). Complementary impact echo and ground penetrating radar evaluation of bridge decks on 1-84 interchange in Connecticut. In *Earthquake Engineering and Soil Dynamics* (pp. 1-10). http://dx.doi.org/10.1061/40779(158)8.

[14] Chen, R., Tran, K. T., La, H. M., Rawlinson, T., & Dinh, K. (2022). Detection of delamination and rebar debonding in concrete structures with ultrasonic SH-waveform tomography. *Automation in Construction*, Volume 133, 104004. http://dx.doi.org/10.1016/j.autcon.2021.104004.

[15] Epp, T. and Cha, Y. J., 2016. Air-coupled impact-echo damage detection in reinforced concrete using wavelet transforms. Smart Materials and Structures, 26(2), p. 025018. http://dx.doi.org/10.1088/1361-665X/26/2/025018.

[16] Epp, T., Svecova, D. and Cha, Y. J., 2018. Semi-Automated air-coupled impact-echo method for large-scale parkade structure. Sensors, 18(4), p. 1018. http://dx.doi.org/10.3390/s18041018.

[17] Ahmed, M., Moselhi, O., & Bhowmick, A. (2018). Two-tier data fusion method for bridge condition assessment. *Canadian Journal of Civil Engineering,* 45(3), (pp. 197-214). http://dx.doi.org/10.1139/cjce-2017-0160.

[18] Omar, T., Nehdi, M. L., & Zayed, T. (2017). Performance of NDT techniques in appraising condition of reinforced concrete bridge decks. *Journal of Performance of Constructed Facilities,* 31(6), 04017104. http://dx.doi.org/10.1061/(ASCE)CF.1943-5509.0001098.

[19] Kee, S. H., Oh, T., Popovics, J. S., Arndt, R. W., & Zhu, J. (2012). Nondestructive bridge deck testing with air-coupled impact-echo and infrared thermography. *Journal of Bridge Engineering,* 17(6), (pp. 928-939). http://dx.doi.org/10.1061/(ASCE)BE.1943-5592.0000350.

[20] Dabous, S. A., Yaghi, S., Alkass, S., & Moselhi, O. (2017). Concrete bridge deck condition assessment using IR Thermography and Ground Penetrating Radar technologies. *Automation in Construction,* 81, (pp. 340-354). http://dx.doi.org/10.1016/j.autcon.2017.04.006.

[21] Yehia, S., Abudayyeh, O., Nabulsi, S., & Abdelqader, I. (2007). Detection of common defects in concrete bridge decks using nondestructive evaluation techniques. *Journal of Bridge Engineering,* 12(2), (pp. 215-225). http://dx.doi.org/10.1061/(ASCE)1084-0702(2007)12:2(215).

[22] Oh, T., Kee, S. H., Arndt, R. W., Popovics, J. S., & Zhu, J. (2013). Comparison of NDT methods for assessment of a concrete bridge deck. *Journal of Engineering Mechanics,* 139(3), (pp. 305-314). http://dx.doi.org/10.1061/(ASCE)EM.1943-7889.0000441.

[23] Cha, Y. J., Choi, W., & Büyüköztürk, O. (2017). Deep learning-based crack damage detection using convolutional neural networks. *Computer-Aided Civil and Infrastructure Engineering,* 32(5), (pp. 361-378). http://dx.doi.org/10.1111/mice.12263.

[24] LeCun, Y., Bottou, L., Bengio, Y., & Haffner, P. (1998). Gradient-based learning applied to document recognition. *Proceedings of the IEEE,* 86(11), (pp. 2278-2324). http://dx.doi.org/10.1109/5.726791.

[25] Kang, D., & Cha, Y. J. (2018). Autonomous UAVs for structural health monitoring using deep learning and an ultrasonic beacon system with geo-tagging. *Computer-Aided Civil and Infrastructure Engineering,* 33(10), (pp. 885-902). http://dx.doi.org/10.1111/mice.12375

[26] Ali, R., Kang, D., Suh, G., & Cha, Y. J. (2021). Real-time multiple damage mapping using autonomous UAV and deep faster region-based neural networks for GPS-denied structures. *Automation in Construction,* volume 130, 103831. http://dx.doi.org/10.1016/j.autcon.2021.103831.

[27] Ren, Y., Huang, J., Hong, Z., Lu, W., Yin, J., Zou, L., & Shen, X. (2020). Image-based concrete crack detection in tunnels using deep fully convolutional networks. *Construction and Building Materials,* volume 234, 117367. http://dx.doi.org/10.1016/j.conbuildmat.2019.117367.

[28] Yang, Q., Shi, W., Chen, J., & Lin, W. (2020). Deep convolution neural network-based transfer learning method for civil infrastructure crack detection. *Automation in Construction,* volume 116, 103199. http://dx.doi.org/10.1016/j.autcon.2020.103199.

[29] Kang, D., Benipal, S. S., Gopal, D. L., & Cha, Y. J. (2020). Hybrid pixel-level concrete crack segmentation and quantification across complex backgrounds using deep learning. *Automation in Construction,* volume 118, 103291. http://dx.doi.org/10.1016/j.autcon.2020.103291.

[30] Pan, Y., Zhang, G., & Zhang, L. (2020). A spatial-channel hierarchical deep learning network for pixel-level automated crack detection. *Automation in Construction,* volume 119, 103357. http://dx.doi.org/10.1016/j.autcon.2020.103357.

[31] Dung, C. V., & Anh, L. D. (2019). Autonomous concrete crack detection using deep fully convolutional neural network. *Automation in Construction,* volume 99, (pp. 52-58). http://dx.doi.org/10.1016/j.autcon.2018.11.028.

[32] Saleem, M. R., Park, J. W., Lee, J. H., Jung, H. J., & Sarwar, M. Z. (2021). Instant bridge visual inspection using an unmanned aerial vehicle by image capturing and geo-tagging system and deep convolutional neural network. *Structural Health Monitoring,* 20(4), (pp. 1760-1777). http://dx.doi.org/10.1177/1475921720932384.

[33] Beckman, G. H., Polyzois, D., & Cha, Y. J. (2019). Deep learning-based automatic volumetric damage quantification using depth camera. *Automation in Construction,* 99, (pp. 114-124). http://dx.doi.org/10.1016/j.autcon.2018.12.006.

[34] Puliti, M., Montaggioli, G., & Sabato, A. (2021). Automated subsurface defects' detection using point cloud reconstruction from infrared images. *Automation in Construction,* volume 129, 103829. http://dx.doi.org/10.1016/j.autcon.2021.103829.

[35] Park, G., Lee, M., Jang, H., & Kim, C. (2021). Thermal anomaly detection in walls via CNN-based segmentation. *Automation in Construction,* volume 125, 103627. http://dx.doi.org/10.1016/j.autcon.2021.103627.

[36] Cha, Y. J., Choi, W., Suh, G., Mahmoudkhani, S., & Büyüköztürk, O. (2018). Autonomous structural visual inspection using region-based deep learning for detecting multiple damage types. *Computer-Aided Civil and Infrastructure Engineering,* 33(9), (pp. 731-747). http://dx.doi.org/10.1111/mice.12334.

[37] Ren, S., He, K., Girshick, R., & Sun, J. (2015). Faster r-cnn: Towards real-time object detection with region proposal networks. In *Advances in neural information processing systems* (pp. 91-99). http://dx.doi.org/10.1109/TPAMI.2016.2577031.

[38] Ali, R., & Cha, Y. J., (2019). Subsurface damage detection of a steel bridge using deep learning and uncooled micro-bolometer, Construction and Building Materials, 226, (pp. 376-387). http://dx.doi.org/10.1016/j.conbuildmat.2019.07.293.

[39] Ali, R., (2019). Deep learning- and infrared thermography-based subsurface damage detection in a steel bridge. Available at: http://hdl.handle.net/1993/33799.

[40] Ali, R., Zeng, J., & Cha, Y. J. (2020). Deep learning-based crack detection in a concrete tunnel structure using multispectral dynamic imaging. In *Smart Structures and NDE for Industry* 4.0, *Smart Cities, and Energy Systems* (Vol. 11382, p. 1138203). International Society for Optics and Photonics. http://dx.doi.org/10.1117/12.2557900.

[41] Choi, W., & Cha, Y. J. (2019). SDDNet: Real-time crack segmentation. *IEEE Transactions on Industrial Electronics,* 67(9), (pp. 8016-8025). http://dx.doi.org/10.1109/TIE.2019.2945265.

[42] Kang, D., & Cha, Y. J. (2021). Efficient attention-based deep encoder and decoder for crack segmenta-

[43] Yu, C., Wang, J., Peng, C., Gao, C., Yu, G., & Sang, N. (2018). Bisenet: Bilateral segmentation network for real-time semantic segmentation. In Proceedings of the European conference on computer vision (ECCV) (pp. 325-341). http://dx.doi.org/10.1007/978-3-030-01261-8_20.

[44] Shijie, J., Ping, W., Peiyi, J., & Siping, H. (2017). Research on data augmentation for image classification based on convolution neural networks. In 2017 *Chinese automation congress (CAC)* (pp. 4165-4170). IEEE. http://dx.doi.org/10.1109/CAC.2017.8243510.

[45] Goodfellow, I., Pouget-Abadie, J., Mirza, M., Xu, B., Warde-Farley, D., Ozair, S., . . . & Bengio, Y. (2014). Generative adversarial nets. In *Advances in neural information processing systems* (pp. 2672-2680). https://doi.org/10.48550/arXiv.1406.2661.

[46] Radford, A., Metz, L., & Chintala, S. (2015). Unsupervised representation learning with deep convolutional generative adversarial networks. *arXiv preprint* arXiv:1511.06434. https://doi.org/10.48550/arXiv.1511.06434.

[47] Nguyen, T. D., Le, T., Vu, H., & Phung, D. (2017). Dual discriminator generative adversarial nets. *arXiv preprint* https://doi.org/10.48550/arXiv.1709.03831.

[48] Arjovsky, M., Chintala, S., & Bottou, L. (2017). Wasserstein gan. *arXiv preprint.* https://doi.org/10.48550/arXiv.1701.07875.

[49] Gulrajani, I., Ahmed, F., Arjovsky, M., Dumoulin, V., & Courville, A. C. (2017). Improved training of wasserstein gans. In *Advances in neural information processing systems* (pp. 5767-5777). https://doi.org/10.48550/arXiv.1704.00028.

[50] DJI Matrice 210 with Zenmuse XT2 thermal Available at: https://www.dji.com/ca/zenmuse-xt2.

[51] FLIR thermal camera T650 SC Available at: http://www.flirmedia.com/MMC/THG/Brochures/RND_061/RND_061_US.pdf.

[52] Zhang, H., Goodfellow, I., Metaxas, D., & Odena, A. (2019). Self-attention generative adversarial networks. In *International conference on machine learning* (pp. 7354-7363). PMLR. https://doi.org/10.48550/arXiv.1805.08318.

[53] Rukundo, O., & Cao, H. (2012). Nearest neighbor value interpolation. *arXiv preprint.* https://doi.org/10.48550/arXiv.1211.1768.

[54] He, K., Zhang, X., Ren, S., & Sun, J. (2016). Deep residual learning for image recognition. In *Proceedings of the IEEE conference on computer vision and pattern recognition* (pp. 770-778). http://dx.doi.org/10.1109/CVPR.2016.90.

[55] Park, H., Yoo, Y., Seo, G., Han, D., Yun, S., & Kwak, N. (2018). C3: Concentrated-Comprehensive Convolution and its application to semantic segmentation. *arXiv preprint.* https://doi.org/10.48550/arXiv.1812.04920.

[56] Park, H., Sjösund, L. L., Yoo, Y., Bang, J., & Kwak, N. (2019). Extremec3net: Extreme lightweight portrait segmentation networks using advanced c3-modules. *arXiv preprint.* https://doi.org/10.48550/arXiv.1812.04920.

[57] Berman, M., Rannen Triki, A., & Blaschko, M. B. (2018). The lovász-softmax loss: A tractable surrogate for the optimization of the intersection-over-union measure in neural networks. In *Proceedings of the IEEE Conference on Computer Vision and Pattern Recognition* (pp. 4413-4421). https://doi.org/10.48550/arXiv.1705.08790.

[58]. The Bay Parkade Winnipeg. http://winnipegdowntownplaces.blogspot.com/2009/11/450-memorial-boulevard-bay-parkade.html.

[59] ASTM C597, "Standard Test Method for Pulse Velocity Through Concrete", Book of Standards Volume 04.02, ASTM International. Available at: https://www.astm.org/c0597-16.html.

[60] Affinity photo editing software Available at: https://affinity.serif.com/en-gb/photo/.

[61] Palmero, C., Clapés, A., Bahnsen, C., Møgelmose, A., Moeslund, T. B., & Escalera, S. (2016). Multimodal rgb-depth-thermal human body segmentation. *International Journal of Computer Vision,* 118(2), (pp. 217-239). http://dx.doi.org/10.1007/s11263-016-0901-x

[62] Heusel, M., Ramsauer, H., Unterthiner, T., Nessler, B., & Hochreiter, S. (2017). Gans trained by a two time-scale update rule converge to a local nash equilibrium. In *Advances in neural information processing systems* (pp. 6626-6637). https://doi.org/10.48550/arXiv.1706.08500.

[63] Zhou, Z., Siddiquee, M. M. R., Tajbakhsh, N., & Liang, J. (2019). Unet++: Redesigning skip connections to exploit multiscale features in image segmentation. *IEEE transactions on medical imaging,* 39(6), (pp. 1856-1867). http://dx.doi.org/10.1109/TMI.2019.2959609

[64] König, J., Jenkins, M. D., Barrie, P., Mannion, M., & Morison, G. (2019, September). A convolutional neural network for pavement surface crack segmentation using residual connections and attention gating. In 2019 *IEEE International Conference on Image Processing (ICIP)* (pp. 1460-1464). IEEE. http://dx.doi.org/10.1109/ICIP.2019.8803060

[65] Ji, A., Xue, X., Wang, Y., Luo, X., & Xue, W. (2020). An integrated approach to automatic pixel-level crack detection and quantification of asphalt pavement. *Automation in Construction,* volume 114, 103176. http://dx.doi.org/10.1016/j.autcon.2020.103176

[66] Zhang, R., Isola, P., Efros, A. A., Shechtman, E., & Wang, O. (2018). *The unreasonable effectiveness of deep features as a perceptual metric.* In Proceedings of the IEEE conference on computer vision and pattern recognition (pp. 586-595). https://doi.org/10.4 8550/arXiv.1801.03924.

[67] Chudasama, V., Patel, H., Prajapati, K., Upla, K. P., Ramachandra, R., Raja, K., & Busch, C. (2020). *Therisurnet—a computationally efficient thermal image super-resolution network.* In Proceedings of the IEEE/CVF Conference on Computer Vision and Pattern Recognition Workshops (pp. 86-87). https://doi.org/10.1109/cvprw50498.2020.00051.

[68] Özkanoğlu, M. A., & Ozer, S. (2022). *InfraGAN: A GAN architecture to transfer visible images to infrared domain.* Pattern Recognition Letters, 155, (pp. 69-76). https://doi.org/10.1016/j.patrec.2022.01.026.

Tables

TABLE 1

Total images collected

|  | Damaged | Intact | Image size |
|---|---|---|---|
| Image collected | 500 | 250 | 640 × 480 × 3 |

TABLE 2

Traditional data augmentation

|  | Input images from Table 1 | Augmented damaged images | Image size |
|---|---|---|---|
| Image collected | 500 Damaged images | 1,510 | 640 × 480 × 3 |

TABLE 3

Training data for AGAN and generated images of AGAN

|  | Training (Intact + Damaged) | Newly generated images | Image size |
|---|---|---|---|
| AGAN | 250 (from Table 1) + 1510 (from Table 2) = 1760 | 320 | 640 × 480 × 3 |

TABLE 4

IDSNet training and testing

|  | Training | Testing | Image size |
|---|---|---|---|
| IDSNet | 1754 from [61] for pretraining, 500 (from Table 1) + 320 (from Table 3) = 820 | 84 | 640 × 480 × 3 |

TABLE 5

FID comparative studies

| Original images | Synthetic images | Modified DCGAN (FID) | Modified D2GAN (FID) | AGAN without attention (FID) | AGAN with attention (FID) | AGAN with attention and GAP (FID) | Improvement compared to modified DCGAN (%) |
|---|---|---|---|---|---|---|---|
| 50 | 50 | 137.09 | 172.19 | 132.42 | 125.42 | 124.33 | 9.30 |
| 100 | 100 | 112.92 | 137.58 | 97.52 | 91.52 | 92.54 | 9.03 |
| 150 | 150 | 107.82 | 128.58 | 99.17 | 91.02 | 95.81 | 11.13 |
| 200 | 200 | 102.19 | 117.15 | 94.35 | 84.29 | 86.29 | 15.55 |
| 250 | 250 | 101.02 | 118.44 | 93.87 | 78.57 | 87.67 | 13.21 |
| 275 | 275 | 102.22 | 117.81 | 93.85 | 74.09 | 73.88 | 27.70 |

TABLE 6

Learned Perceptual Image Patch Similarity (LPIPS) comparative studies

|  | DCGAN | D2GAN | AGAN |
|---|---|---|---|
| LPIPS | 0.428 | 0.484 | 0.343 |

TABLE 7

Network segmentation performances

| Metric | IDSNet mean |
|---|---|
| mIoU | 0.900 |
| PPV | 0.937 |
| F1-score | 0.935 |
| Sensitivity | 0.948 |

TABLE 8

Effects of AGAN, modified D2GAN, modified DCGAN and modules

| Model (%) | mIoU | PPV | F1-Score | Sensitivity | # of parameters |
|---|---|---|---|---|---|
| Without AGAN data | 0.785 | 0.865 | 0.828 | 0.844 | 0.085 |
| Without Superficial module | 0.771 | 0.918 | 0.830 | 0.825 | 0.071 |
| Without Pretrained | 0.891 | 0.937 | 0.935 | 0.948 | 0.085 |
| With modified DCGAN | 0.846 | 0.899 | 0.887 | 0.894 | 0.085 |
| With modified D2GAN | 0.821 | 0.881 | 0.878 | 0.871 | 0.085 |
| Final IDSNet | 0.900 | 0.952 | 0.941 | 0.942 | 0.085 |

TABLE 9

Comparative study results

| Model | mIoU | PPV | F1-Score | Sensitivity | FPS | # of parameters |
|---|---|---|---|---|---|---|
| UNet++ | 0.822 | 0.914 | 0.875 | 0.872 | 34 | 26.9M |
| DeeplabV3+ | 0.814 | 0.877 | 0.879 | 0.898 | 36.2 | 39.6M |
| Attention UNet | 0.876 | 0.905 | 0.907 | 0.928 | 18.35 | 34.8M |
| IDSNet | 0.900 | 0.952 | 0.941 | 0.942 | 74.27 | 0.085M |

TABLE A(1)

Details of r in SBs of ICM and RICM

| Module | SB | r | Module | SB | r |
|---|---|---|---|---|---|
| ICM | SB1 | 1 | RICM-1 | SB1 | 3 |
|  | SB2 | 2 |  | SB2 | 4 |
|  | SB3 | 3 | RICM-2 | SB1 | 3 |
|  | SB4 | 1 |  | SB2 | 5 |
|  | SB5 | 4 | RICM-2 | SB1 | 4 |
|  | SB6 | 7 |  | SB2 | 8 |

TABLE A(2)

Damage sizes from the surface

| Slab surface | Damage | Size (W × H × D) m | Depth from the surface of the slab (m) |
|---|---|---|---|
| S1 | D1 | 0.090 × 0.090 × 0.010 | 0.0450, 0.060 |
|  | D2 | 0.090 × 0.090 × 0.010 | 0.050, 0.070, 0.080 |
| S2 | D3 | 0.090 × 0.090 × 0.010 | 0.030, 0.011, 0.012 |
|  | D4 | 0.090 × 0.090 × 0.010 | 0.045, 0.050, 0.055 |
| S3 | D5 | 0.090 × 0.090 × 0.010 | 0.010, 0.080 |
|  | D6 | 0.090 × 0.090 × 0.010 | 0.050, 0.070 |
| S4 | D7 | 0.150 × 0.150 × 0.010 | 0.070 |
| S5 | D8 | 0.080 × 0.080 × 0.010 | 0.010, 0.020, 0.030, 0.040 |
|  | D9 | 0.060 × 0.060 × 0.0004 | 0.010, 0.015, 0.020, 0.030 |
|  | D10 | 0.090 × 0.090 × 0.0006 | 0.015 |
|  | D11 | 0.150 × 0.150 × 0.010 | 0.030, 0.011 |
| S6 | D12 | 0.120 × 0.120 × 0.010 | 0.030, 0.040, 0.050, 0.055, 0.060, 0.070, 0.080, 0.011, 0.012 |
| S7 | D13 | 0.090 × 0.090 × 0.010 | 0.040, 0.050, 0.070 |
|  | D14 | 0.120 × 0.120 × 0.010 | 0.020, 0.030, 0.040 |
| S8 | D15 | 0.150 × 0.120 × 0.001 | 0.050, 0.060, 0.070, 0.080, 0.011, 0.012 |
| S9 | D16 | 0.100 × 0.080 × 0.010 | 0.030 |
|  | D17 | 0.200 × 0.020 × 0.010 | 0.030 |
|  | D18 | 0.080 × 0.060 × 0.010 | 0.050 |
|  | D19 | 0.200 × 0.025 × 0.005 | 0.045 |
| S10 | D20 | 0.060 × 0.050 × 0.005 | 0.020 |
|  | D21 | 0.060 × 0.015 × 0.0004 | 0.015 |
|  | D22 | 0.060 × 0.060 × 0.005 | 0.030 |
| S11 | D23 | 0.060 × 0.050 × 0.005 | 0.025 |
|  | D24 | 0.150 × 0.150 × 0.005 | 0.035 |
| S12 | D25 | 0.150 × 0.150 × 0.001 | 0.06 |
|  | D26 | 0.200 × 0.020 × 0.002 | 0.04 |
|  | D27 | 0.750 × 0.150 × 0.001 | 0.045 |

The invention claimed is:

1. A computer-implemented method for analyzing an image to detect an article of interest, comprising:
receiving the image, wherein the image is thermographic;
processing the image using a machine learning algorithm configured to detect the article of interest, wherein the machine learning algorithm comprises a convolutional neural network;
and displaying the image with location of the article of interest being indicated if determined to be present by the convolutional neural network;
wherein the convolutional neural network comprises:
a first convolution module configured to receive the image and to extract features of the thermographic image to form a feature map, wherein the first convolution module comprises at least one convolution layer, wherein each convolution layer comprises a convolution operator, batch normalization and a nonlinear activation function;

a second convolution module after the first convolution module and configured to reduce size of the feature map, wherein the second convolution module comprises at least one convolution layer, wherein each convolution layer of the second convolution module comprises a convolution operator, batch normalization and a nonlinear activation function;

an average pooling module after the first convolution module and configured to receive an output of the first convolution module, wherein the average pooling module comprises at least one series of iterations of average pooling operators;

an in-depth module after the second convolution module and the average pooling module and configured to learn correlations and contextual features of the image, wherein the in-depth module receives, as input, an output of the second convolution module concatenated with an output of the average pooling module;

a final pointwise convolution layer after the in-depth module and configured to receive an output thereof;

a preliminary upsampling module after the final convolution layer and configured to receive an output thereof, wherein the preliminary upsampling module comprises one or more iterations of an upsampling operator;

a superficial module after the first convolution module and configured to receive the feature map thereof, wherein the superficial module comprises parallel depth-wise asymmetric convolution layers configured to extract features relevant to the article of interest; and a secondary upsampling module after the superficial module and the preliminary upsampling module and configured to receive outputs thereof, wherein the secondary upsampling module comprises one or more iterations of an upsampling operator.

2. The computer-implemented method of claim 1 wherein said at least one convolution layer of the first convolution module comprises a plurality of convolution layers, wherein consecutive initial ones of the convolution layers at a beginning of the first convolution module have common filter sizes and a final one of the convolution layers has a different filter size than the consecutive initial convolution layers.

3. The computer-implemented method of claim 1 wherein said at least one convolution layer of the second convolution module comprises a single convolution layer with a smaller filter size than said at least one convolution layer of the first convolution module.

4. The computer-implemented method of claim 1 wherein the in-depth module comprises an in-depth convolution submodule including depth-wise asymmetric convolution layers and depth-wise dilated separable convolution layers, plural series of iterations of residual in-depth convolution submodules and one or more concatenation modules respectively configured to concatenate outputs of submodules of the in-depth module upstream thereof, wherein each of the residual in-depth convolution submodules comprises depth-wise asymmetric convolution layers and depth-wise separable dilated convolution layers, wherein an output of each residual in-depth convolution submodule includes an input thereto, wherein each subsequent one of the iterations in a respective one of the series of residual in-depth convolution submodules has a different dilation rate.

5. The computer-implemented method of claim 4 wherein the plural series of iterations of residual in-depth convolution submodules comprises first and second series thereof, wherein the first series of iterations of residual in-depth convolution submodules is after the in-depth convolution submodule and the second series of iterations of residual in-depth convolution submodules is after the first series thereof and has different filter sizes than the residual in-depth convolution submodules of the first series.

6. The computer-implemented method of claim 5 wherein, when said at least one series of iterations of average pooling operators of the average pooling module comprises first and second series thereof having different filter sizes and said first series, with larger filter size than said second series, forms the output of the average pooling module that is concatenated with the output of the second convolution module to form the input of the in-depth module, the one or more concatenation modules comprises a first concatenation module between the first and second series of iterations of residual in-depth convolution submodules such that an output of the first concatenation module is an input to the second series of iterations of residual in-depth convolution submodules, wherein the first concatenation module is configured to receive, as input, an output of the in-depth convolution submodule, an output of the first series of iterations of residual in-depth convolution submodules and the second series of average pooling operators of the average pooling module.

7. The computer-implemented method of claim 5 wherein, when the second series of iterations of residual in-depth convolution submodules comprises first and second iterations thereof, the one or more concatenation modules of the in-depth module comprises a second concatenation module after the second series of iterations of residual in-depth convolution submodules and configured to receive, as input, respective outputs of the first and second iterations of the second series of iterations of residual in-depth convolution submodules.

8. The computer-implemented method of claim 4 wherein the in-depth convolution submodule is a first module of the in-depth module.

9. The computer-implemented method of claim 4 wherein the in-depth convolution submodule comprises plural iterations of a sub-submodule including one of the depth-wise asymmetric convolution layers and one of the depth-wise separable dilated convolution layers after said depth-wise asymmetric convolution layer and including a depth-wise dilated convolution and a pointwise convolution thereafter, wherein a dilation rate of each subsequent one of the iterations is different.

10. The computer-implemented method of claim 9 wherein the in-depth convolution submodule comprises plural parallel operations each comprising the plural iterations of the sub-submodule, wherein the dilation rates of the depth-wise asymmetric and separable dilated convolution layers of the parallel operations are different, and wherein, in at least one of the plural parallel operations, the dilation rate of each subsequent iteration of the sub-submodule is the same.

11. The computer-implemented method of claim 10 wherein an output of the in-depth convolution submodule is a concatenation of outputs of the parallel operations.

12. The computer-implemented method of claim 9 wherein the in-depth convolution submodule includes a convolution layer before the plural iterations of the sub-submodule.

13. The computer-implemented method of claim 4 wherein each of the residual in-depth convolution submodules comprises plural parallel operations, one of which includes a convolutional layer and another two of which include one of the depth-wise asymmetric convolution layers and one of the depth-wise separable dilated convolution layers after said depth-wise asymmetric convolution layer and including a depth-wise dilated convolution and a pointwise convolution thereafter, wherein dilation rates of said another two of the parallel operations are different.

14. The computer-implemented method of claim 13 wherein an output of each residual in-depth convolution submodule is a concatenation of outputs of the parallel operations thereof.

15. The computer-implemented method of claim 13 wherein each residual in-depth convolution submodule includes a pointwise convolution before the parallel operations.

16. The computer-implemented method of claim 1 wherein the superficial module further includes convolution layers respectively after the parallel depth-wise asymmetric convolution layers.

17. The computer-implemented method of claim 16 wherein outputs of the convolution layers after the parallel depth-wise asymmetric convolution layers are summed and a pointwise convolution is applied thereto.

18. The computer-implemented method of claim 17 wherein an output of the pointwise convolution is summed with an input of the superficial module to form an output of the superficial module.

19. The computer-implemented method of claim 16 wherein the superficial module includes a convolution layer before the depth-wise asymmetric convolution layers.

20. The computer-implemented method of claim 16 wherein the superficial module is consecutively iterated.

\* \* \* \* \*